United States Patent
Fontoura et al.

(10) Patent No.: US 10,768,920 B2
(45) Date of Patent: Sep. 8, 2020

(54) UPDATE COORDINATION IN A MULTI-TENANT CLOUD COMPUTING ENVIRONMENT

(71) Applicant: Microsoft Technology Licensing, LLC, Redmond, WA (US)

(72) Inventors: Marcus Fontoura, Clyde Hill, WA (US); Mark Russinovich, Hunts point, WA (US); Yunus Mohammed, Bellevue, WA (US); Pritesh Patwa, Redmond, WA (US); Avnish Kumar Chhabra, Redmond, WA (US); Ziv Rafalovich, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 295 days.

(21) Appl. No.: 15/183,257

(22) Filed: Jun. 15, 2016

(65) Prior Publication Data
US 2017/0364345 A1 Dec. 21, 2017

(51) Int. Cl.
*G06F 8/65* (2018.01)
*G06F 9/52* (2006.01)
*G06F 9/50* (2006.01)

(52) U.S. Cl.
CPC .............. *G06F 8/65* (2013.01); *G06F 9/5072* (2013.01); *G06F 9/52* (2013.01)

(58) Field of Classification Search
CPC ................ G06F 7/78; G06F 8/00–8/78; G06F 9/44–9/455; G06F 11/36
See application file for complete search history.

(56) References Cited

U.S. PATENT DOCUMENTS

| 7,165,250 B2 | 1/2007 | Lyons |
| 7,464,126 B2 | 12/2008 | Chen |

(Continued)

FOREIGN PATENT DOCUMENTS

| WO | 2002062031 A2 | 8/2002 |
| WO | 2006004491 A2 | 1/2006 |
| WO | 2016201340 A1 | 12/2016 |

OTHER PUBLICATIONS

"2—Hosting a Multi-Tenant Application on Windows Azure", retrieved from <<https://msdn.microsoft.com/en-us/library/hh534478.aspx>>, Published on: Dec. 14, 2012, 15 pages.

(Continued)

*Primary Examiner* — Doon Y Chow
*Assistant Examiner* — Timothy P Duncan
(74) *Attorney, Agent, or Firm* — Ogilvie Law Firm

(57) ABSTRACT

Software updates within one or more regions of a multi-tenant cloud are coordinated. Tenant vs. tenant conflicts, tenant vs. infrastructure provider conflicts, and conflicts between security and another priority are identified and resolved using a shared update coordinator, update priority specifications, and availability specifications. An infrastructure update request may be presented to tenants for approval. Postponed infrastructure updates may be prioritized higher. Preventing exploits of zero-day vulnerabilities may be prioritized over meeting availability targets. Updates may be merged to reduce downtime, even when the updates originate from independently controlled entities. Maximum downtime, minimum fault domains, minimum virtual machines, permitted update start times, and other availability criteria may be specified. Updates may be preempted, or allowed to complete, based on their relative priorities. Tenants and infrastructure providers may still use their own deployment engines after updates are coordinated. Rogue (Continued)

behaviors involving adverse update approvals or disapprovals may be detected.

20 Claims, 6 Drawing Sheets

(56) References Cited

U.S. PATENT DOCUMENTS

| | | | |
|---|---|---|---|
| 7,480,817 B2 | 1/2009 | Fan et al. | |
| 8,074,107 B2 | 12/2011 | Sivasubramanian et al. | |
| 8,161,479 B2 | 4/2012 | Sedukhin et al. | |
| 8,606,938 B1 | 12/2013 | Chong et al. | |
| 8,776,041 B2 | 7/2014 | Kachroo et al. | |
| 8,799,218 B2 | 8/2014 | Liu et al. | |
| 8,838,535 B2 | 9/2014 | Hu et al. | |
| 8,875,122 B2 | 10/2014 | Driesen et al. | |
| 9,195,702 B2 | 11/2015 | Bourbonnais et al. | |
| 2001/0048728 A1* | 12/2001 | Peng | G06F 12/121 375/354 |
| 2002/0152305 A1* | 10/2002 | Jackson | H04L 41/5035 709/224 |
| 2005/0246705 A1* | 11/2005 | Etelson | G06F 8/70 718/100 |
| 2006/0184930 A1 | 8/2006 | Fuente et al. | |
| 2006/0184937 A1* | 8/2006 | Abels | G06F 8/65 718/1 |
| 2007/0271561 A1* | 11/2007 | Winner | G06F 8/65 718/1 |
| 2010/0228819 A1 | 9/2010 | Wei | |
| 2011/0083179 A1* | 4/2011 | Lawson | H04L 63/1458 726/22 |
| 2011/0321031 A1* | 12/2011 | Dournov | G06F 8/65 717/171 |
| 2012/0102480 A1* | 4/2012 | Hopmann | G06F 8/67 717/172 |
| 2012/0102481 A1 | 4/2012 | Mani et al. | |
| 2012/0210310 A1 | 8/2012 | Cooley et al. | |
| 2013/0041989 A1 | 2/2013 | Boss et al. | |
| 2013/0067090 A1 | 3/2013 | Batrouni et al. | |
| 2013/0151681 A1* | 6/2013 | Dournov | G06F 8/656 709/223 |
| 2013/0151688 A1* | 6/2013 | Widjaja | H04L 67/1097 709/224 |
| 2013/0179877 A1* | 7/2013 | Dain | G06F 8/60 717/178 |
| 2013/0227085 A1 | 8/2013 | Choi et al. | |
| 2013/0339204 A1 | 12/2013 | Dias De Assuncao et al. | |
| 2014/0068595 A1 | 3/2014 | Belinsky et al. | |
| 2014/0068613 A1* | 3/2014 | Iriguchi | G06F 9/45545 718/1 |
| 2014/0068732 A1* | 3/2014 | Hinton | G06F 21/41 726/6 |
| 2014/0282469 A1 | 9/2014 | Johnson et al. | |
| 2015/0032817 A1 | 1/2015 | Garg et al. | |
| 2016/0006666 A1 | 1/2016 | Nageshrao et al. | |
| 2016/0306735 A1* | 10/2016 | Adderly | G06F 11/3664 |
| 2016/0364265 A1* | 12/2016 | Cao | G06F 9/4818 |
| 2017/0177323 A1* | 6/2017 | Baset | G06F 8/65 |

OTHER PUBLICATIONS

Srinivas, et al., "A Study on Cloud Computing Disaster Recovery", in International Journal of Innovative Research in Computer and Communication Engineering, vol. 1, Issue 6, Aug. 2013, pp. 1380-1389.

Wiselman, Rayne., "Business continuity and disaster recovery (BCDR): Azure Paired Regions", retrieved from <<https://azure.microsoft.com/en-in/documentation/articles/best-practices-availability-paired-region>>, retrieved on Jan. 29, 2016, 6 pages.

Wood, et al., "Disaster Recovery as a Cloud Service: Economic Benefits & Deployment Challenges", In Proceedings of the 2nd USENIX conference on Hot topics in cloud computing, Jun. 22, 2010, pp. 1-7.

"Distributed Virtual Data Center for Enterprise and Service Provider Cloud", in White Paper by Cisco, Mar. 19, 2014, pp. 1-34.

Wolloch, Uri., "Enterprise-class EC2 Backup and Disaster Recovery", retrieved from <<http://www.n2ws.com/blog/ec2_disaster_recovery.html>>, Published May 18, 2013, 4 pages.

"How to Design a Disaster Recovery Plan", retrieved from <<https://cloud.google.com/solutions/designing-a-disaster-recovery-plan>>, Published Sep. 8, 2015, 10 pages.

Robinson, et al., "Using Amazon Web Services for Disaster Recovery", in whitepaper from Amazon Web Services, Oct. 2014, pp. 1-22.

Wickline, "Azure Business Continuity Technical Guidance", retrieved from <<https://msdn.microsoft.com/en-us/library/azure/hh873027.aspx>>, May 13, 2016, 3 pages.

Myers, Tamra, "Azura Storage Redundancy Options", retrieved from <<https://msdn.microsoft.com/en-us/library/azure/dn727290.aspx>>, Apr. 10, 2015, 5 pages.

"Infosys—Business Technology Consulting", retrieved from <<https://www.infosys.com/>>, Retrieved on Feb. 5, 2016, 1 page.

Zander, Jason, "Final Root Cause Analysis and Improvement Areas: Nov 18 Azure Storage Service Interruption", retrieved from <<https://azure.microsoft.com/en-us/blog/final-root-cause-analysis-and-improvement-areas-nov-18-azure-storage-service-interruption/>>, Published on: Dec. 17, 2014, 8 pages.

Zander, Jason, "Update on Azure Storage Service Interruption", retrieved from <<https://azure.microsoft.com/en-us/blog/update-on-azure-storage-service-interruption/>>, Published on Nov. 19, 2014, 5 pages.

Laing, Bill, "Summary of Windows Azure Service Disruption on Feb. 29, 2012", retrieved from <<https://azure.microsoft.com/en-us/blog/summary-of-windows-azure-service-disruption-on-feb-29th-2012/>>, Published on Mar. 9, 2012, 12 pages.

Neil, Mike, "Details of the Feb. 22, 2013 Windows Azure Storage Disruption", retrieved from <<https://azure.microsoft.com/en-us/blog/details-of-the-february-22nd-2013-windows-azure-storage-disruption/>>, Published on Mar. 1, 2013, 7 pages.

"AWS Regions and Endpoints-Amazon Web Services", retrieved from <<http://docs.aws.amazon.com/general/latest/gr/rande.html>>, Retrieved on Feb. 5, 2016, 41 pages.

Bindal, Shivan, "AWS Reboot: FAQs", retrieved from <<http://www.rightscale.com/blog/rightscale-news/aws-reboot-faqs#What is the specific timing and will all my impacted instances be rebooted at once?>>, Published on Sep. 25, 2014, 8 pages.

"Regions and Zones-Google Cloud Platform", retrieved from <<https://cloud.google.com/compute/docs/zones>>, Retrieved on Feb. 5, 2016, 8 pages.

Kerner, et al., "Simultaneous Instance Maintenance across Zones & Regions?", retrieved from <<https://groups.google.com/forum/?utm_medium=email&utm_source=footer#Imsg/gce-discussion/iQ_4vtEHoME/z1ilwq7HNXAJ>>, Published on Dec. 29, 2014, 1 page.

"Service-level agreement", retrieved from <<https://en.wikipedia.org/wiki/Service-level_agreement>>, Apr. 7, 2016, 6 pages.

"Cloud computing", retrieved from <<https://en.wikipedia.org/wiki/Cloud_computing>>, May 8, 2016, 19 pages.

"Upgrading AlwaysOn Availability Group Replica Instances", retrieved from <<https://msdn.microsoft.com/en-us/library/dn178483.aspx>>, Mar. 1, 2016, 6 pages.

"Azure Exam Prep—Fault Domains and Update Domains", retrieved from <<https://blogs.msdn.microsoft.com/plankytronixx/2015/05/01/azure-exam-prep-fault-domains-and-update-domains/>>, May 1, 2015, 10 pages.

"Regions and Availability Zones—Amazon Elastic Compute Cloud", retrieved from <<http://docs.aws.amazon.com/AWSEC2/latest/UserGuide/using-regions-availability-zones.ht . . . >>, Retrieved on Feb. 8, 2016, 11 pages.

"AWS Regions and Endpoints—Amazon Web Services", retrieved from <<http://docs.aws.amazon.com/general/latest/gr/rande.html>>, Retrieved on Jan. 22, 2016, 42 pages.

(56) References Cited

OTHER PUBLICATIONS

Myers, "Azure Storage replication", retrieved from <<https://azure.microsoft.com/en-us/documentation/articles/storage-redundancy/>>, Jan. 5, 2016, 4 pages.

"Azure Business Continuity Technical Guidance", retrieved from <<https://msdn.microsoft.com/en-us/library/azure/hh873027.aspx>>, Mar. 26, 2015, 34 pages.

Kerner, et al., "Microsoft Azure Regional Strategy: Availability, DR, Proximity, and Residency", presentation, May 5, 2015, 19 slides.

"International Search Report and Written Opinion Issued in PCT Application No. PCT/US2017/036467", dated Aug. 9, 2017, 12 Pages.

* cited by examiner

UPDATE COORDINATION IN A MULTI-TENANT CLOUD COMPUTING ENVIRONMENT

BACKGROUND

A cloud computing environment, also called a "cloud environment" or simply a "cloud", provides shared processing resources on demand over at least one network. Often, but not always, the cloud computing environment is accessed over the Internet. The processing resources provided by the cloud computing environment are generally available on demand from shared pools of configurable computing resources such as networks, servers, storage devices, applications, and software services, and the offered resources can be rapidly provisioned and released with relatively small management effort from the users. A cloud environment's computing and storage solutions provide the cloud's users with varied and flexible capabilities to store and process their data in third-party datacenters. The cloud's users are often called "guests" or "tenants".

Some cloud providers offer an "Infrastructure-as-a-Service" (IaaS), which includes offering the use of computers, either "bare metal" physical computers or (more often) virtual machines. IaaS services generally spare the cloud's tenants from dealing with details of infrastructure such as the physical location of a server within a datacenter, the data partitioning and replication locations used, and the administrative details of computational resource scaling, by hiding those details from the tenants. IaaS tenants can develop and run their software solutions on the IaaS cloud platform without the cost and complexity of buying and managing the underlying hardware. A hypervisor may run the virtual machines on behalf of the tenants, which can often allow one or more operating systems within respective virtual machines to share a single hardware host. Hypervisors within the cloud can generally support many virtual machines and can scale the offered services up and down, according to tenants' varying requirements. To deploy their applications in the cloud, tenants install their own operating system images on top of the cloud's virtual machines, then install their application software on top of the operating systems. In an IaaS model, each tenant is responsible both for updates to the operating systems and for updates to the application software the tenant runs.

Some cloud providers offer a "Platform-as-a-Service" (PaaS), which includes offering a development environment to application developers. PaaS services generally spare the cloud's tenants from dealing with infrastructure details required for installing and updating operating system images, by hiding those details from the tenants. Thus, a PaaS offering may run on top of one or more IaaS offerings. The PaaS provider typically offers toolkits and standards for software development and may offer channels for software distribution and for licensing or subscription payments. A PaaS provider generally provides tenants with a computing platform, typically including an operating system, one or more programming language execution environments, database services, and/or web services. Application developers can develop and run their software solutions on the PaaS cloud platform without the cost and complexity of buying and managing the underlying hardware and software. With some PaaS offerings, the underlying computer and storage resources scale automatically to match application demand so that the cloud tenant does not have to allocate those resources manually.

SUMMARY

Some technologies described herein are directed to the technical activity of identifying and reducing or eliminating update conflicts between different architectural levels (IaaS level, PaaS level, application level) within a cloud computing environment, and/or reducing or eliminating update conflicts between independently controlled entities within the cloud. For example, conflicts between virtual machine updates and PaaS platform updates may be resolved to reduce downtime. Some examples are directed to the technical activity of identifying and reducing or eliminating conflicts between security updates that impact multiple tenants, on the one hand, and availability targets or availability requirements that are specific to one tenant, on the other. Other technical activities pertinent to teachings herein will also become apparent to those of skill in the art.

Some embodiments coordinate updates in a multi-tenant cloud computing environment. An update coordinator receives a first update request from a first update requester specifying a first update to at least part of the cloud computing environment, and receives a second update request from a second update requester specifying a second update to at least part of the cloud computing environment. The update requesters are distinct entities, such as two independently controlled tenants, or a PaaS tenant and a PaaS provider, or a PaaS tenant and an IaaS provider, or the PaaS provider and the IaaS provider, or another IaaS tenant and the IaaS provider. Each update request makes a request concerning an update, such as a request that an update be performed as soon as possible, a request that an update be performed at a specified time or in response to a specified condition, a request that an update be postponed, or a request that an update not be performed at all.

In some examples, the update coordinator coordinates the update requests to control performance of at least one update. Coordination of update requests may include identifying and then resolving a conflict between update requests. Conflicts may arise, for example, when update requests are from independently controlled tenants, when one update requester is a tenant and the other update requester is a cloud computing infrastructure service provider (e.g., IaaS provider or PaaS provider), when one update request has security as a highest priority and the other does not, or when one update request has the security of multiple tenants as highest priority and the other update request has the availability of resources to a particular tenant as the highest priority.

In some examples, update conflict resolution may include, for example, presenting an infrastructure update request to a tenant for approval or denial, notifying the tenant of an upcoming performance of an infrastructure update, prioritizing an update based on a predetermined priority specification (particularly for infrastructure updates), increasing the priority of postponed updates, allowing an update to complete before beginning another update, preempting performance of an update already underway in favor of another update, accessing an availability specification, balancing unavailability due to an update against security enhancement from the update, and/or merging updates into a joint update. The update coordinator may give a deployment engine approval to perform an update, or the coordinator may give approvals to the requesters which then direct their respective deployment engines.

In some examples, the update coordinator may be monitored to detect rogue behavior by the update coordinator or the requesters. For instance, rogue behavior may manifest as a flood of update requests, as availability-degrading approvals of a flood of update requests, or as security-threatening disapprovals of requests to update a cloud infrastructure component.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
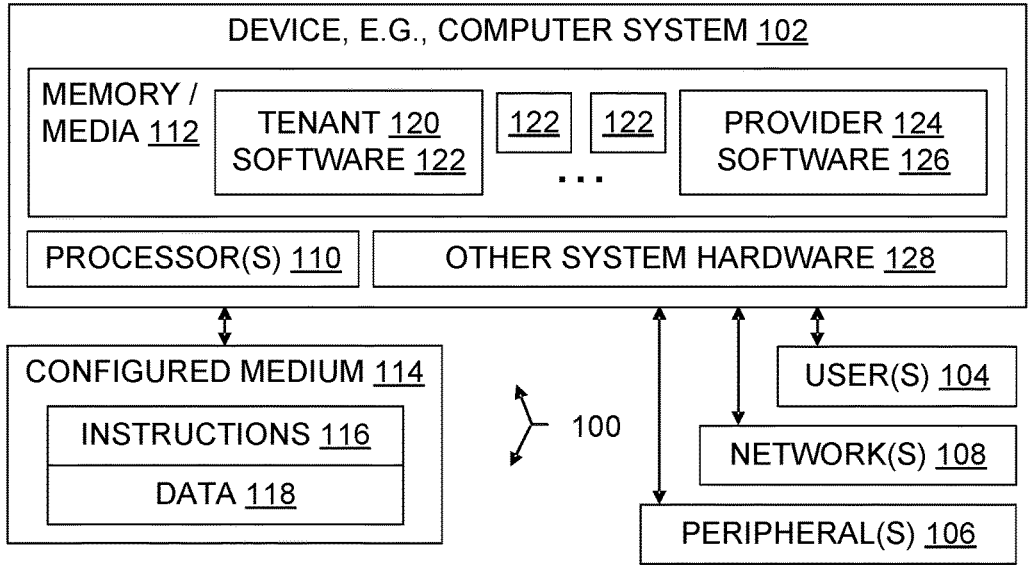
FIG. 1 is a block diagram illustrating a cloud computer system having at least one processor and at least one memory which interact with one another under the control of software, and also illustrating some configured storage medium examples.

Traditionally, cloud tenants have not coordinated with infrastructure providers when scheduling or performing updates to the software that the tenants brought to the cloud. Similarly, cloud infrastructure providers have traditionally performed updates to the infrastructure they provide whenever they themselves deemed it appropriate, with little or no coordination between the infrastructure providers and their customers—the cloud's tenants—as to the timing of those infrastructure updates. Instead, the primary interface between tenants and infrastructure providers, so far as software updates are concerned, has been Service Level Agreement (SLA) provisions which specify service levels the infrastructure provider will provide to the tenant.

An SLA technical provision may specify a 99.99% uptime for virtual machines, for example. With respect to that provision, when updating the virtual machines it provides, the infrastructure provider is free to unilaterally choose the update frequencies, specific times of day an update is performed, and sequences of progression from updating one virtual machine to the next, so long as the virtual machine infrastructure still delivers the specified 99.99% uptime. Similarly, if an SLA technical provision specifies a minimum number of data replicas, a minimum number of fault domains, or a similar constraint, then the infrastructure provider is free to unilaterally choose the update frequencies, specific times an update is performed, and all other characteristics of an infrastructure update, so long as the infrastructure still delivers the specified minimum resources in compliance with the provision. Giving an advance notice or an advance description of an update to the tenant is not typically required of the infrastructure provider, although such information may be given from time to time as a courtesy or in an ad hoc manner.

As for communication between the cloud tenants themselves, traditionally there has not been any communication at all so far as updates are concerned. Update notices from one tenant to one or more other tenants of a given cloud, as a consequence of their mutual presence in that cloud, is not covered at all by an SLA between a tenant and the infrastructure provider—it is a tenant-tenant matter, not a tenant-infrastructure provider matter. Tenants of a given public cloud do not traditionally have agreements between themselves regarding the resources of the cloud they all reside within. Independently controlled tenants of a given cloud have not traditionally coordinated at all with one another, so far as updates to the cloud they share are concerned, despite the fact that any given cloud has limited resources and at some point two tenants may compete for use of the same resource.

Some innovations described herein provide an update coordinator in a cloud to coordinate some or all of the infrastructure updates and application updates. The update coordinator may receive requests for infrastructure updates from an infrastructure provider and receive requests for application updates from tenants. The update coordinator resolves conflicts between update requests according to specified criteria, such as update policies (i.e., specifications) and relative priorities of different kinds of updates and/or different tenants. In some cases, an update coordinator may present infrastructure update requests to one or more tenants for approval according to the tenant's own policies in order to preserve the availability of its services to the tenant and the availability of the tenant's services to those who use the tenant's application software. In other cases, an update coordinator may approve infrastructure update requests without notifying the tenants, e.g., to prevent zero-day exploits.

Conflicts involving one or more update requests can arise in a wide variety of situations, and a particular update coordinator may be tailored to identify and/or resolve conflicts in some or all of these situations. Three introductory examples follow, but one of skill will acknowledge that these examples do not cover all of the situations in which an update coordinator can be used to advantage.

Example One: a tenant-provider conflict. A platinum-level cloud tenant desires that its database application never be down for more than five seconds at a time. A PaaS infrastructure provider wants to update a device driver in an operating system that is used by the database application, but the device driver update will take at least nine seconds to perform, and the database application will be unavailable during that entire time. A cloud update coordinator may be tailored to identify this kind of conflict using data from an infrastructure update request (e.g., estimated duration of downtime due to update) and data from an availability specification (maximum acceptable downtime). The identified update conflict may then be directed to a human administrator for handling and/or (for better efficiency) the conflict may be automatically resolved by the update coordinator using the infrastructure update request, the tenant's availability specification, and a priority specification which specifies relative priorities of routine driver updates and platinum-level tenant availability levels.

Example Two: another tenant-provider conflict. A cloud tenant SLA technical provision specifies that the tenant's online transaction processing software be able to run continuously on at least twenty virtual machines spread evenly between two availability zones; in the absence of updates or failures, the tenant software normally runs on thirty or more virtual machines spread evenly over the two availability zones (in this example, "evenly" means the difference in the number of virtual machines between the availability zones is no greater than two). An IaaS infrastructure provider wants to update all of the virtual machines in the cloud as quickly as possible with a security patch to prevent exploitation of a zero-day security vulnerability. During the update, the virtual machine being updated will be unavailable, and thus any software that was running on that virtual machine will also stop running.

In this Example Two, a cloud update coordinator may be tailored to identify this situation as one involving a conflict between a tenant availability specification and an infrastructure update expected downtime and/or to identify the situation as one involving a conflict between a high-priority security update and another non-security priority (i.e., the availability priority of maintaining a minimum number of virtual machines and/or minimum number of availability zones). The most straightforward approach from the infrastructure provider's perspective is to update all virtual machines concurrently. This would put the security patch in place the fastest, but it would also violate the tenant availability specification to the maximum extent by cutting the number of virtual machines and the number of availability zones both to zero. Fortunately, a different approach can be taken by a suitable update coordinator. Assuming the initial state includes fifteen virtual machines running for the tenant in availability zone one and sixteen virtual machines running for the tenant in availability zone two, the update conflict may be automatically resolved by the update coordinator using an automatically generated update sequence (a resolution) such as the following:

1. Initiate updates to five virtual machines in availability zone one—this leaves ten virtual machines still running in availability zone one, which satisfies the availability minimum.
2. Concurrently with the zone one update in step #1, initiate updates to six virtual machines in availability zone two—this leaves ten virtual machines still running in availability zone two, which satisfies the availability minimum.
3. Assume that initiating an update in step #1 or step #2 above either includes or is preceded by terminating or suspending the tenant software that is running on the virtual machine. Therefore, as virtual machine updates complete, restart (if terminated) or continue (if suspended) execution of the tenant software on the updated virtual machine.
4. For each updated virtual machine on which the tenant software is running again, initiate an update to another virtual machine that has not yet been updated, until all virtual machines have been updated.

Example Three: a tenant-tenant conflict. A cloud tenant X runs a video streaming application that makes heavy use of cloud network bandwidth during broadcast events and uses very little bandwidth at other times. A cloud tenant Y wants to upgrade its database software, which includes a migration rather than a conversion in place. The migration involves copying all of the data from its current location to a format conversion program and then sending three copies of the converted data onward through the cloud to three separate storage facilities. It may well be that neither tenant realizes that the other is a tenant of the same cloud, or that their demands on cloud network bandwidth may conflict if not properly coordinated. The conflict may nonetheless be identified by a suitable update coordinator in the cloud infrastructure they share. If tenant X has been guaranteed sufficient bandwidth for its streaming application and tenant Y has no conflicting guarantee, resolution in favor of tenant X is straightforward. However, it may occur that X and Y are both opportunistic bandwidth users, so that neither has a guarantee in advance that their demands will be satisfied. In that case, the update coordinator may still identify the conflict and resolve it by scheduling the tenant Y update so that it uses bandwidth when that bandwidth is not being used by tenant X.

Additional examples are discussed elsewhere herein. Other examples of conflicts between updates, availability, security, and other priorities will also be recognized by one of skill in the art in view of the teachings herein.

Some embodiments described herein may be viewed in a broader context. For instance, concepts such as applications, availability, conflict, infrastructure, priority, virtual machines, and updates may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving applications, availability, conflict, infrastructure, priority, virtual machines, and/or updates are outside the present scope. Accordingly, vagueness, mere abstractness, lack of technical character, and accompanying proof problems are also avoided under a proper understanding of the present disclosure.

The technical character of embodiments described herein will be apparent to one of ordinary skill in the art, and will also be apparent in several ways to a wide range of attentive readers. First, some embodiments address technical activities that are rooted in computing technology, such as identifying and resolving conflicts between application software and infrastructure software updates, or conflicts between updates by different cloud tenants. Second, some embodiments include technical components such as computing hardware which interacts with software in a manner beyond the typical interactions within a general purpose computer. For example, in addition to normal interaction such as memory allocation in general, memory reads and write in general, instruction execution in general, and some sort of I/O, some embodiments described herein analyze update requests to identify computing resource conflicts. Third, technical effects provided by some embodiments include avoidance of at least some conflicts for a shared computing resource such as bandwidth or a running virtual machine that could occur without update coordination. Fourth, some embodiments include technical adaptations such as availability specifications, update priority specifications, and update requests from different tenants of a cloud to a shared update coordinator. Fifth, some embodiments modify technical functionality of a cloud computing environment by adding a regional update manager or other update coordinator through which update requests flow from independently controlled entities using the cloud. Sixth, technical advantages of some embodiments include improved efficiency in computing resource allocation, improved avoidance of application downtime, and improved communication between processes running in a cloud. Other advantages will also be apparent to one of skill from the description provided.

ACRONYMS AND ABBREVIATIONS

Some acronyms and abbreviations are defined below. Others may be defined elsewhere herein or require no definition to be understood by one of skill.
ALU: arithmetic and logic unit
API: application program interface
APP: application
CD: compact disc
CPU: central processing unit
DVD: digital versatile disk or digital video disc
FD: fault domain
FPGA: field-programmable gate array
FPU: floating point processing unit
GPU: graphical processing unit
GUI: graphical user interface
IDE: integrated development environment, sometimes also called "interactive development environment"
MPI: message passing interface
MR: management role
OS: operating system
RAM: random access memory
REST: representational state transfer
ROM: read only memory
SDK: software development kit
SLA: service level agreement
SMS: short message service
UD: update domain (or upgrade domain)
VM: virtual machine
XML: extensible markup language
Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, smartphones, smartwatches, smartbands, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on server computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Optimize" means to improve, not necessarily to perfect. For example, it may be possible to make further improvements in a program which has been optimized.

"Program" is used broadly herein, to include applications, kernels, drivers, interrupt handlers, firmware, state machines, libraries, and other code written by programmers (who are also referred to as developers) and/or automatically generated.

"Routine" means a function, a procedure, an exception handler, an interrupt handler, or another block of instructions which receives control via a jump and a context save. A context save pushes a return address on a stack or otherwise saves the return address, and may also save register contents to be restored upon return from the routine.

"Update" and "upgrade" are used interchangeably herein, to mean a change in software. Although updates are often intended as improvements, for present purposes the change made by an update does not necessarily add features, does not necessarily improve the functionality of the software in question, and does not necessarily replace the entire software with a different version.

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance; (g) embedment in an implanted medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, or physical transportation system monitoring.

Unless otherwise indicated, "tenant" refers to an IaaS tenant; "tenant" may also refer to a PaaS tenant (i.e., tenant of a PaaS platform) when so indicated. The distinction between an IaaS tenant and a PaaS tenant may be notable in some situations. For example, from an IaaS tenant's perspective, operating systems running in virtual machines are not part of the infrastructure that is provided by the cloud provider, but from a PaaS tenant's perspective, those operating systems are part of the infrastructure provided by the PaaS provider. Similarly, unless otherwise expressly indicated by use of "PaaS", as used herein "infrastructure provider" or "cloud infrastructure provider" refers to an IaaS provider, and "infrastructure" or "cloud infrastructure" refers to infrastructure which includes at least one virtual machine but does not necessarily include an operating system. These default interpretations in favor of IaaS are provided for clarity, but one of skill will acknowledge after study that the teachings herein pertain in most ways to both kinds of infrastructure providers.

It should also be understood that "infrastructure provider" and "tenant" are used herein in distinction to one another; they are different roles within the cloud computing environment. An infrastructure provider provides cloud infrastructure (e.g., virtual machines, operating systems) which is used by the tenant. The infrastructure provider and the tenant are independently controlled entities unless expressly stated otherwise. A PaaS provider (PSP) plays both roles: the PSP is an infrastructure provider with respect to a tenant who develops or runs application software on the platform provided by the PSP, and the PSP is a tenant with respect to an IaaS provider who provides the virtual machines the PaaS platform runs on.

As used herein, "independently controlled" entities in a cloud may include tenants and/or infrastructure providers which are recognized in the legal jurisdiction of each as being separate from one another with respect to at least one of the following: obligations to tax authorities, property ownership, product liability, contractual rights and obligations, rights under criminal law.

A "hypervisor" is a software platform that runs virtual machines. Some examples include Xen® (mark of Citrix Systems, Inc.), Hyper-V® (mark of Microsoft Corporation), and KVM (Kernel-based Virtual Machine) software.

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Operations such as transmitting update requests, identifying update conflicts, and approving and performing updates, are understood herein as requiring and providing speed and accuracy that are not obtainable by human mental steps, in addition to their inherently digital nature. This is understood by persons of skill in the art but others may sometimes need to be informed or reminded of that fact.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Linguistically" means by using a natural language or another form of communication which is often employed in face-to-face human-to-human communication. Communicating linguistically includes, for example, speaking, typing, or gesturing with one's fingers, hands, face, and/or body.

Throughout this document, use of the optional plural "(s)", "(es)", or "(ies)" means that one or more of the indicated feature is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/ Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, would be deemed part of the structures identified in the application for zac widgets and would help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as accessing, allowing, approving, controlling, coordinating, detecting, determining, disapproving, giving, identifying, increasing, merging, notifying, performing, postponing, preempting, presenting, prioritizing, receiving, resolving, spanning, specifying, updating (and accesses, accessed, allows, allowed, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave outside the scope of patentable subject matter under United States Patent and Trademark Office (USPTO) interpretation of the In re Nuijten case. No claim covers a signal per se in the United States, and any claim interpretation that asserts otherwise is unreasonable on its face. Unless expressly stated otherwise in a claim granted outside the United States, a claim does not cover a signal per se.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se.

An "embodiment" herein is an example. The term "embodiment" is not interchangeable with "the invention". Embodiments may freely share or borrow aspects to create other embodiments (provided the result is operable), even if a resulting aspect combination is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. Thus for example, various kinds of update conflict resolution 812 are discussed, but they are all referred to and encompassed by reference numeral 812. The list of reference numerals is:

- 100 cloud computing operating environment, also referred to as a cloud or as an operating environment
- 102 computer system
- 104 users
- 106 peripherals
- 108 network
- 110 processor
- 112 computer-readable storage medium, e.g., RAM, hard disks
- 114 removable configured computer-readable storage medium
- 116 instructions executable with processor
- 118 data
- 120 tenant, e.g., guest
- 122 software controlled and/or provided primarily by a tenant
- 124 infrastructure provider, e.g., cloud infrastructure services provider
- 126 software controlled and/or provided primarily by infrastructure provider
- 128 system hardware in addition to processor and memory
- 200 illustrative portion A of a cloud computing environment architecture
- 202 tenant applications
- 204 software libraries
- 206 software development tools, e.g., compiler, debugger, profiler, etc.
- 208 interfaces, e.g., management consoles, command line interfaces
- 210 software development kits
- 212 value-added services
- 214 authentication and/or authorization service
- 216 monitoring and/or alerting service
- 218 deployment engine and/or deployment service
- 220 capacity provisioning service, e.g., shard allocation, VM scaling
- 222 load balancing service
- 224 platform blocks which support one or more applications
- 226 parallel processing block
- 228 payment processing block
- 230 content delivery block
- 232 workforce block
- 234 email block
- 236 messaging block
- 238 infrastructure blocks (some examples of infrastructure pieces)
- 240 compute block
- 242 storage block
- 244 networking block
- 246 database block
- 248 physical infrastructure of cloud computing environment, and groupings thereof
- 250 geographic regions
- 252 availability zones
- 254 cloud edge locations
- 256 datacenters
- 300 illustrative portion B of a cloud computing environment architecture
- 302 operating system
- 304 storage blob (binary large object)
- 306 virtual machine
- 308 resource manager
- 310 platform
- 312 fabric
- 314 management software and data for managing physical infrastructure
- 316 anti-virus software
- 400 illustrative portion C of a cloud computing environment architecture
- 402 business app program
- 404 web service
- 406 multimedia app or service
- 408 software-as-a-service (SaaS)
- 410 software framework
- 412 platform-as-a-service (PaaS)
- 414 network bandwidth
- 416 infrastructure-as-a-service (IaaS)
- 502 update coordinator system (includes computing hardware configured with special-purpose software 508 and/or special-purpose update conflict resolution circuitry)
- 504 specification used in resolving update conflicts
- 506 priority assigned to particular kind of update
- 508 update coordinator software
- 510 update requester and corresponding software
- 512 update request
- 514 response to update request
- 800 flowchart illustrating aspects of some methods
- 802 receive an update request
- 804 specify an update in a request
- 806 coordinate update requests
- 808 perform an update
- 810 an update
- 812 resolve a conflict involving updates
- 814 resolve an update conflict involving two tenants (this is a special case of an 812 resolution)
- 816 an update conflict involving two tenants
- 818 resolve an update conflict involving a tenant and an infrastructure provider (this is another special case of an 812 resolution)
- 820 an update conflict involving a tenant and an infrastructure provider
- 822 resolve an update conflict involving security as a priority and some other priority, e.g., availability or compliance with an SLA (this is another special case of an 812 resolution)
- 824 an update conflict involving security as a priority and some other priority
- 826 access a specification, e.g., an update priorities specification or an availability specification
- 828 availability specification
- 830 present an update request to a tenant for approval/disapproval 832 obtain tenant approval/disapproval of an update request
834 disapproval of an update request (by any entity)
836 approval of an update request (by any entity)
838 notify a tenant of an upcoming update
840 use an update priority specification to resolve an update conflict
842 increase an update's priority
844 postpone an update
846 detect rogue behavior of an update coordinator
848 rogue behavior
850 give approval/disapproval of an update deployment
852 disapproval of an update deployment
854 approval of an update deployment
856 merge two or more updates into a single joint update
858 joint update (special case of an update)
860 allow completion of update performance
862 preempt (e.g., interrupt) completion of update performance
864 determine likely downtime (i.e., unavailability) an update will cause
866 contribute to downtime or other failure by permitting or performing update
868 downtime (i.e., availability interruption)
870 prioritize one update request over another
872 respond to update request, e.g., with approval/disapproval
902 regional update manager (a local update coordinator)
904 infrastructure update deployment engine (an example of a deployment engine)
906 guest update deployment engine (another example of a deployment engine)
1002 server (an example of a computer system)
1004 server rack (an example of system hardware)
1006 update domain
1008 fault domain
1102 identify a conflict involving at least one update
1104 conflicts generally
1202 meeting a target, e.g., for availability or security
1204 a computing resource availability target
1206 a cloud environment security target
1302 minimum allowed number of fault domains
1304 minimum allowed capacity, e.g., minimum computing power
1306 preferred/specified period for performing update
1308 service level agreement identifier Operating Environments With reference to FIG. 1, an operating environment 100 for an embodiment, also referred to as a cloud 100, includes at least one computer system 102. The computer system 102 may be a multiprocessor computer system, or not. An operating environment may include one or more machines in a given computer system, which may be clustered, client-server networked, and/or peer-to-peer networked within a cloud 100. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other user interface (UI) presentations. A user interface 122 may be generated on a local desktop computer, or on a smart phone, for example, or it may be generated from a web server and sent to a client. The user interface may be generated as part of a service and it may be integrated with other services, such as social networking services. A given operating environment includes devices and infrastructure which support these different user interface generation options and uses.

Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments and part of a system 102 in other embodiments. Other computer systems not shown in FIG. 1 may interact in technological ways with the computer system 102 or with another system embodiment using one or more connections to a network 108 via network interface equipment, for example.

Each computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se under any claim pending or granted in the United States.

The medium 114 is configured with binary instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In the illustrated cloud environment 100, a tenant 120 runs tenant software 122. The tenant software 122 will often include application software, but other examples are also discussed in connection with FIGS. 2 to 4. A given tenant may run multiple instances of a given software 122, and/or may run a plurality of different software programs 122, as shown. Although for clarity of illustration only one tenant is shown in FIG. 1, a given cloud 100 typically will have multiple tenants 120.

The illustrated cloud environment 100 also has at least one infrastructure provider 124 who provides infrastructure software 126. Some examples are discussed in connection with FIGS. 2 to 4, but one of skill will recognize that infrastructure providers are often categorized by whether they provide IaaS or PaaS infrastructure as a service. For present purposes, a line is drawn between virtual machines 306 and operating systems 302: IaaS providers are those who provide virtual machines and/or provide software and/or hardware underlying virtual machines, while PaaS providers are those who provide operating systems and/or provide software that runs on top of an operating system (which runs in turn on a virtual machine provided by an IaaS provider).

In addition to processors 110 (CPUs, ALUs, FPUs, and/or GPUs), memory/storage media 112, an operating environment may also include other hardware 128, such as displays, batteries, buses, power supplies, wired and wireless network interface cards, accelerators, racks, and network cables, for instance. A display may include one or more touch screens, screens responsive to input from a pen or tablet, or screens which operate solely for output. Cloud hardware such as processors, memory, and networking hardware are provided at least in part by an IaaS provider.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a technical system, such as a portion of the Internet of Things, such that no human user 104 interacts directly with the embodiment. Software processes may be users 104.

In some embodiments, the system includes multiple computers connected by a network 108. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches.

The tenant code 122, infrastructure code 126, and other items shown in the Figures and/or discussed in the text, may each reside partially or entirely within one or more hardware media 112, thereby configuring those media for technical effects which go beyond the "normal" (i.e., least common denominator) interactions inherent in all hardware—software cooperative operation.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

Cloud Architecture Examples

Figure 2:
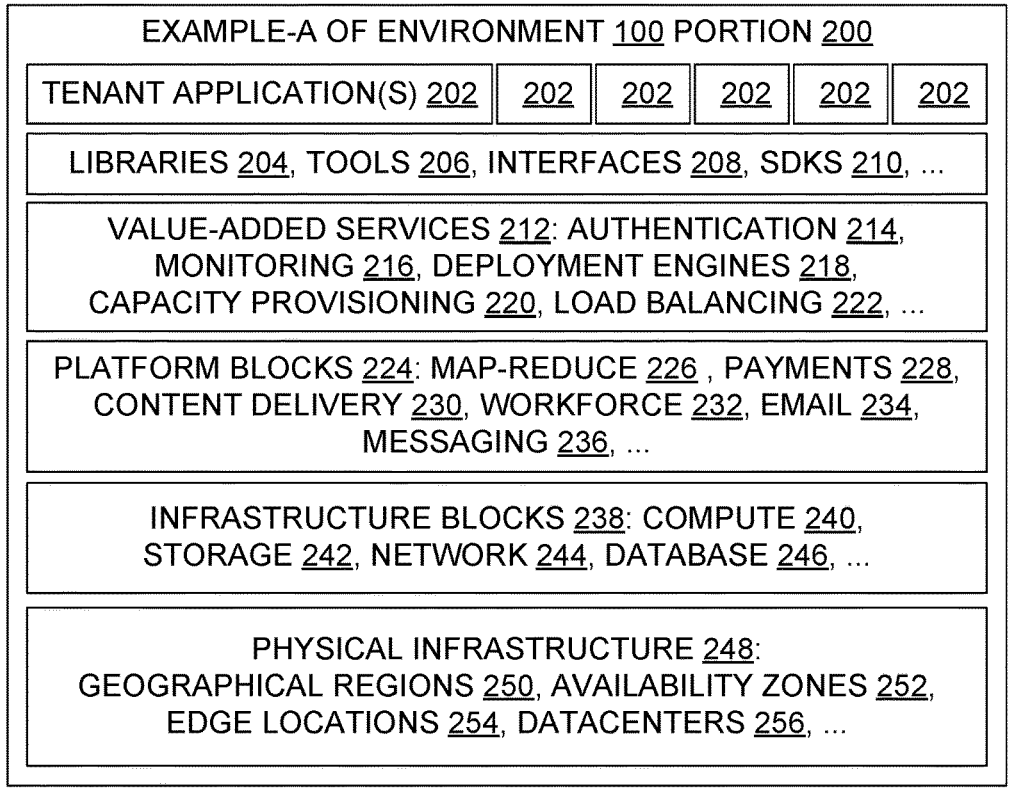
FIG. 2 is a block diagram illustrating aspects of an example cloud computing architecture that is designated here as Example-A.
Figure 3:
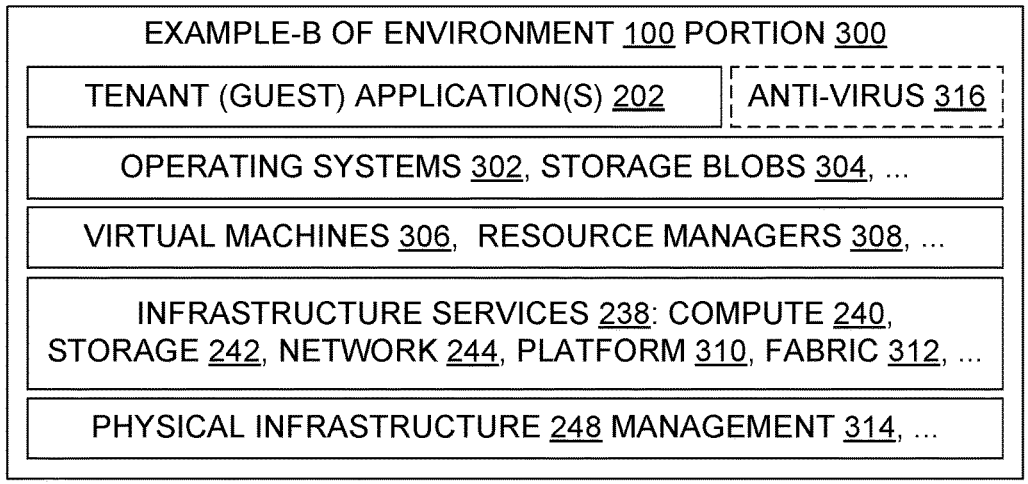
FIG. 3 is a block diagram illustrating aspects of an example cloud computing architecture that is designated here as Example-B.
Figure 4:
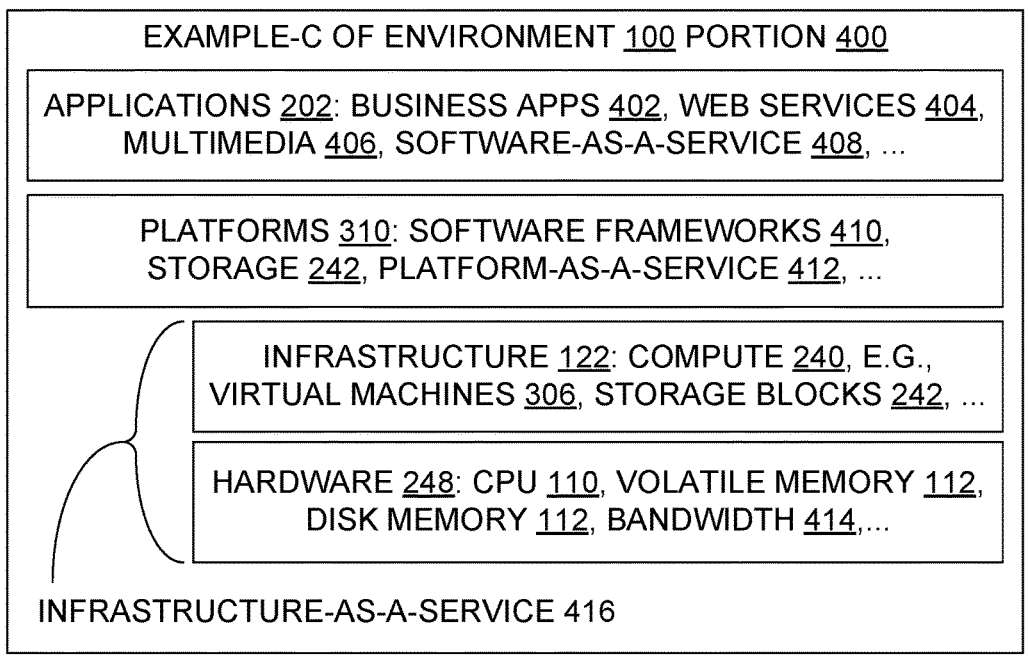
FIG. 4 is a block diagram illustrating aspects of an example cloud computing architecture that is designated here as Example-C.

Although the update coordinator and other innovations described herein are believed to be new, the architectural contexts which they can modify and be used within have aspects which are familiar to those of skill in the art. To help illustrate aspects of the innovations presented herein, FIGS. 2 through 4 present examples of different cloud architectures. The variation in these architectures helps illustrate the wide range of cloud operating environments in which update coordination innovations can be used, and these architectural Figures provide specific examples of cloud tenants, PaaS infrastructures, and IaaS infrastructures, which can now be reconsidered by those of skill and improved in light of the innovative teachings herein.

FIG. 2 illustrates aspects of an architecture which is suitable for use with some embodiments. This architecture portion 200 is generally consistent with public documentation depicting an architecture in some implementations of an Amazon Web Services™ cloud 100 (mark of Amazon Technologies, Inc.) but may also differ from a given implementation of that technology.

In this architecture Example-A, from an IaaS tenant perspective the IaaS infrastructure includes physical infrastructure 248 and infrastructure blocks 238. From an IaaS 416 provider perspective, tenant software 122 includes platform blocks 224, value-added services 212, libraries 204, tools 206, interfaces 208, software development kits 210, and applications 202. A PaaS 412 provider may draw a different line between tenant software and infrastructure, e.g., by treating everything below the tenant applications 202 as part of the infrastructure that is provided by the PaaS provider for use by tenants. Other divisions of items between entities are also possible. Which perspective applies to a tenant in a given situation depends on the services the tenant has engaged. One tenant of this cloud architecture 200 might engage only the physical infrastructure 248 and infrastructure blocks 238, while another tenant engages the physical infrastructure 248, infrastructure blocks 238, and platform blocks 224, but does not use the value-added services 212, for example.

In an architecture such as the one in Example-A, and in some others, libraries 204 and SDKs 210 may include, for example, Microsoft .NET™ libraries and SDKs (mark of Microsoft Corporation), and Java® libraries and SDKs (mark of Oracle America, Inc.). Tools 206 may include cloud resource administration tools, software development tools such as compilers, profilers, and debuggers, deployment tools, sample code, and other items. Interfaces 208 may include web interfaces, e.g., REST APIs, and/or command line interfaces, for example.

In the illustrated architecture, value-added services 212 include one or more of the following: authentication and/or authorization services 214 for identity verification and access management; monitoring services 216 for collecting and tracking computational resource usage metrics, error rates, transaction volumes, and other performance statistics; deployment engines 218 for deploying instances of software in multiple virtual machines; capacity provisioning services 220 for scaling up or down on demand the computing, storage and/or other resources used by tenant software; and load balancing services 222 for balancing computational workloads across multiple servers or other physical resources (sometimes indirectly via balancing across virtual machines, virtual disks, or other virtualized resources).

In the illustrated architecture, platform blocks 224 include one or more of the following: map-reduce and/or other parallel processing blocks 226; payment-processing blocks 228; content delivery blocks 230; workforce blocks 232 for human users in an on-demand workforce to obtain instructions and assignments; email blocks 234; and messaging blocks 236.

In the illustrated architecture, infrastructure blocks 238 include one or more of the following: compute blocks 240 which provide computational capacity; storage blocks 242 which provide storage capacity; network blocks 244 which provide networking capacity; and database blocks 246 which provide database computational and/or storage capacity.

In the illustrated architecture, physical infrastructure 248 includes one or more of the following: geographical regions 250; availability zones 252; edge locations 254 at the edge of the cloud as access points, portals, or interfaces; and datacenters 256 which house the servers and other devices containing the processors 110 and memory 112 to be used by the rest of the cloud architecture.

FIG. 3 illustrates aspects of an architecture which is suitable for use with some embodiments. This architecture portion 300 is generally consistent with public documentation depicting an architecture in some implementations of a Microsoft Azure® Stack cloud environment 100 (mark of Microsoft Corporation) but may also differ from a given implementation of that technology.

In the illustrated architecture, operating systems 302 include software which performs operations such as recognizing input from network connections or peripherals, sending output to network connections or peripherals, keeping track of files and directories in non-volatile storage, and allocating processor and memory resources to applications. Familiar examples of operating systems include software available under names such as Apple OS X, Microsoft Windows, Linux, VMS, and IBM OS/400 (marks of their respective owners), but operating system development is an ongoing activity, and the operating systems 302 are not limited to these particular examples or their variants. Dozens if not hundreds of different operating systems 302 exist.

In the illustrated architecture, a storage blob 304 includes binary data stored as a single item; "blob" stands for binary large object. The data in a given blob may represent anything: video, audio, and executable code are familiar examples of blob content, but other content may also be stored in blobs 304.

In the illustrated architecture, a virtual machine 306 is an emulation of a real or hypothetical physical computer system. Each virtual machine is backed by actual physical computing hardware (e.g., processor 110, memory 112) and can support execution of at least one operating system.

In the illustrated architecture, resource managers 308 control computing resources, such as virtual machines 306, networks 108, and their constituents. Resource control may be implemented through access limitations, provisioning, deployment, and monitoring operations, for example.

In the illustrated architecture, a platform 310 is a software development platform, such as an operating system 302 and an SDK. Platforms 310 are provided in some environments as a service from a PaaS 412 provider.

In the illustrated architecture, a fabric 312 provides a runtime for building distributed, scalable stateless and stateful microservices. Some fabrics 312 also provide application management capabilities for provisioning, deploying, monitoring, upgrading/patching, and deleting deployed microservices and/or applications that use microservices. Some examples of microservices include protocol gateways, user profiles, shopping carts, inventory processing, queues, and caches. In some environments, a fabric and microservices may be part of the infrastructure software that is provided by a PaaS provider.

In the illustrated architecture, physical infrastructure management software 314 includes region pairing specifications and protocol implementation code, code which balances or otherwise distributes virtual machines across fault domains within a datacenter and/or across availability zones, synchronous and asynchronous replication code, hardware fault detection code, transparent virtual machine migration code, and other administrative code.

FIG. 4 illustrates aspects of an architecture which is suitable for use with some embodiments. This architecture portion 400 is generally consistent with public documentation depicting a generic cloud architecture but may differ from a given implementation of a cloud computing environment 100. One of skill will also acknowledge that architectural pieces from any of these examples 200, 300, 400 may be mixed and combined in ways that are not shown here, e.g., an architecture 200 will generally include operating systems 302 and bandwidth 414.

In the illustrated architecture 400, business apps 402 may include online transaction processing applications, ecommerce applications, customer relationship management software, and other enterprise software, for example. In some embodiments, business apps 402 include software-as-a-service (SaaS) 408 offerings. SaaS offerings, sometimes referred to as "on-demand software", provide access to software on a subscription basis over a network from one or more hosting locations.

In the illustrated architecture, web services 404 may include social networks, and other human-user-facing web-based applications and their underlying APIs, for example.

In the illustrated architecture, multimedia 406 may include user-supplied content video websites, e.g., the YouTube® website (mark of Google Inc.) and similar websites. Multimedia 406 may also include media enterprise video rental, streaming, and/or subscription websites, such as the Netflix® website (mark of Netflix, Inc.) or the Hulu® website (mark of Hulu LLC), for example.

In the illustrated architecture, software frameworks 410 may include general-purpose runtime environments which can be tailored to specific uses by the addition of user-written application code. Users can extend the framework but usually cannot modify it. Some familiar examples include the JavaScript® web application framework (mark of Oracle America, Inc.) and the Microsoft .NET™ framework.

In the illustrated architecture, bandwidth 414 refers to hardware which provides network transmission capacity. Bandwidth generally refers to the capacity of an electronic system to send and/or receive data. Like processors 110, memory 112, and similar items, bandwidth 414 will be present in a given cloud 100 regardless of whether that cloud precisely matches a particular example depicted or discussed herein.

As to IaaS 416, one of skill will recognize that different offerings may contain different constituents. For present purposes, IaaS includes at least virtual machines 306 and their supporting physical systems 102. Some examples of available IaaS offerings may include Amazon Web Services (AWS), Microsoft Windows Azure, Google Compute Engine, CenturyLink Cloud, VMWare vCloud Air, Rackspace, and IBM SoftLayer (marks of their respective owners).

Data Flows

Figure 5:
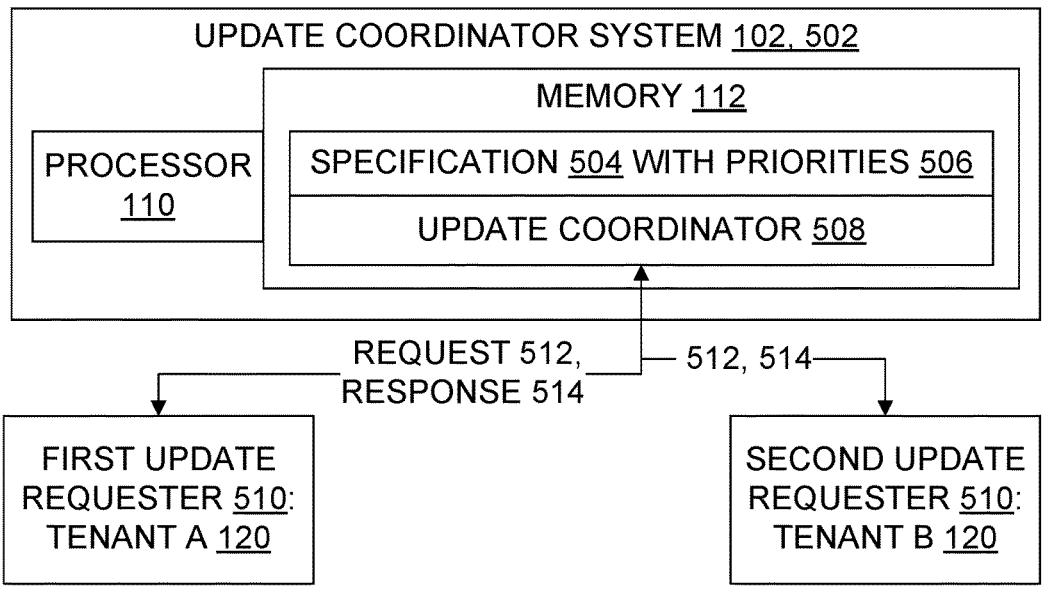
FIG. 5 is a data flow diagram illustrating aspects of an architecture which coordinates update requests from independently controlled tenants in a cloud.
Figure 6:
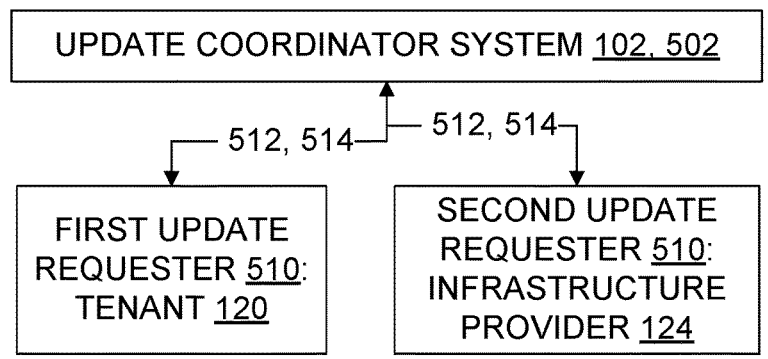
FIG. 6 is a data flow diagram illustrating aspects of an architecture which coordinates update requests from a tenant and an independently controlled infrastructure provider in a cloud.
Figure 7:
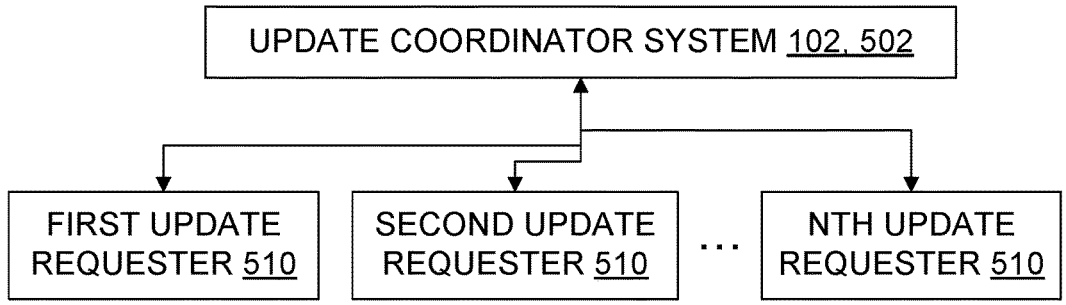
FIG. 7 is a data flow diagram illustrating aspects of an architecture which coordinates update requests from three or more independently controlled entities in a cloud.

FIGS. 5, 6, and 7 illustrate data flow in some embodiments. As noted above, traditionally the independently controlled tenants of a given cloud have not communicated with one another regarding updates to their respective software items 122, at least not on the basis of their mutual presence in the same cloud 100 or with regard to the possibility that their updates might compete for the same computing resource or otherwise conflict at a computational resource level within the cloud they share. But as illustrated in FIG. 5, in some examples using innovations taught herein, different tenants 120 automatically coordinate their update-related plans and activities through a shared update coordinator system 502. The coordination may use one or more specifications 504, which may also be referred to as policies, containing relative priorities 506 for different kinds of update activity and/or different entities.

Figure 13:
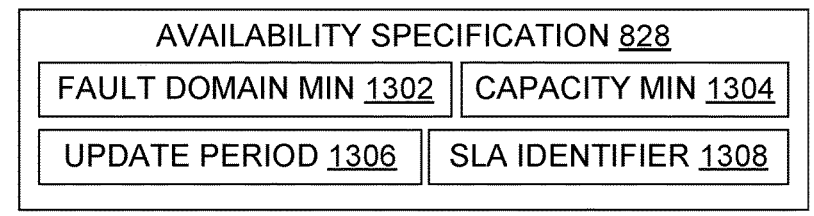
FIG. 13 is a block diagram illustrating an example of an availability specification.

In some implementations, one or more availability specifications 828 may also be used 840 by the update coordinator system 502 to resolve conflicts 1104. As noted in FIG. 13, an availability specification 828 for a piece of software may include data such as the minimum allowed number 1302 of fault domains the software should run on, the minimum capacity 1304 the software should be provided (capacity may be in virtual machine count, processor cycles per second, gigabytes of storage, network bandwidth, and/or other appropriate measures), and the maximum allowed update period 1306 in which the software can be offline, for example. An SLA identifier 1308 may also be part of an availability specification. To help ensure that availability is maximized despite application updates or infrastructure down time, an availability specification 828 may specify that shards of tenant data should be allocated such that having a single update domain or fault domain down will only affect at most one copy of the tenant data. Other availability targets may also be specified.

Returning to FIG. 5, in the illustrated example update coordinator software 508 communicates with the two tenants in their roles as update coordination requesters 510. Each requester 510 sends the update coordinator 508 one or more update requests 512 and receives back from the update coordinator 508 one or more update request responses 514. The requests 512 and responses 514 may be communicated through any suitable electronic communication mechanisms, formats, and protocols, including by way of example web APIs, XML structures, binary data exchanges, and/or MPI code, to name just a few.

The contents used in particular implementations of requests 512 and responses 514 may vary, and may include data used in examples herein. For instance, a request 512 may include a request identification, a requester identification and corresponding authentication, a proposed start time and an expected duration of a requested update overall, a proposed start time and an expected duration of a downtime the update will likely cause, and a list or other description of the virtual machines and/or other software that will be impacted by the update. A response 514 may include an identification or copy of the request 512 the response is responsive to, and an approval or disapproval of that request. Some responses 514 may include a counterproposal for a different time and/or different software if the request in question was not fully approved.

As illustrated in FIG. 6, in some examples using innovations taught herein, a tenant 120 and an infrastructure provider 124 automatically coordinate their update-related plans and activities through a shared update coordinator system 502. In a particular contrast with traditional approaches, this update coordination may include automatic presentation of a proposed infrastructure update to a tenant for approval or disapproval.

As illustrated in FIG. 7, the requests presented to the coordinator 508 to be checked for conflicts do not necessarily come from only two requesters 510 at a time. That is, the innovations taught here may be applied to identify 1102 and resolve update-related conflicts 1104 involving three or more tenants, involving an infrastructure provider (IaaS or PaaS) and two or more tenants, involving three or more infrastructure providers (e.g., one IaaS provider and two PaaS providers), or involving two or more infrastructure providers and one or more tenants, for example.

Processes

Figure 8:
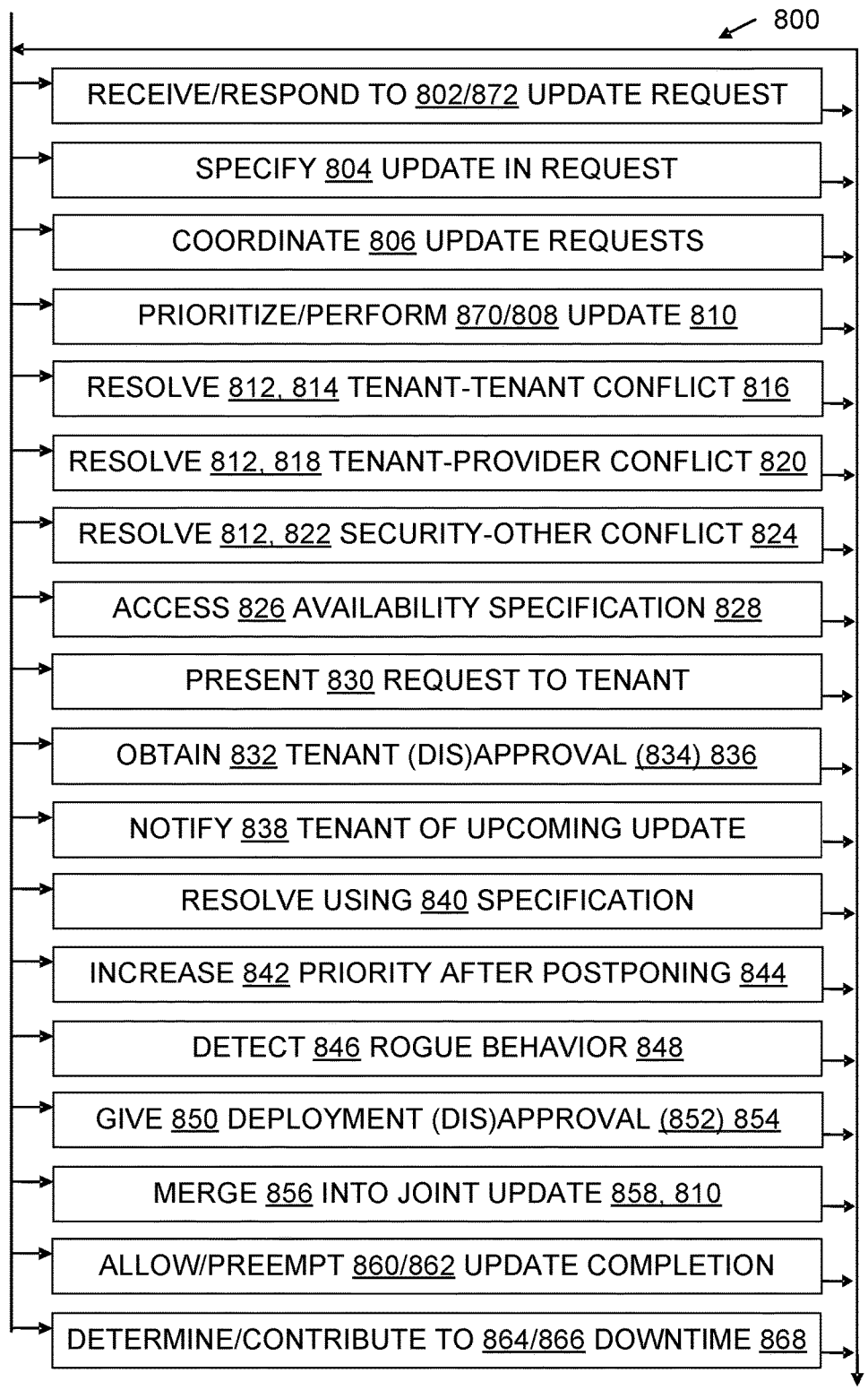
FIG. 8 is a flow chart illustrating aspects of some process and configured storage medium embodiments.

FIG. 8 illustrates some process embodiments in a flowchart 800. Technical processes shown in the Figures or otherwise disclosed will be performed automatically, e.g., by requester 510 code and update coordinator 508 code, unless otherwise indicated. Processes may also be performed in part automatically and in part manually to the extent action by a human administrator or other human person is implicated. No process contemplated as innovative herein is entirely manual. In a given embodiment zero or more illustrated steps of a process may be repeated, perhaps with different parameters or data to operate on. Steps in an embodiment may also be done in a different order than the top-to-bottom order that is laid out in FIG. 8. Steps may be performed serially, in a partially overlapping manner, or fully in parallel. The order in which flowchart 800 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Figure 11:
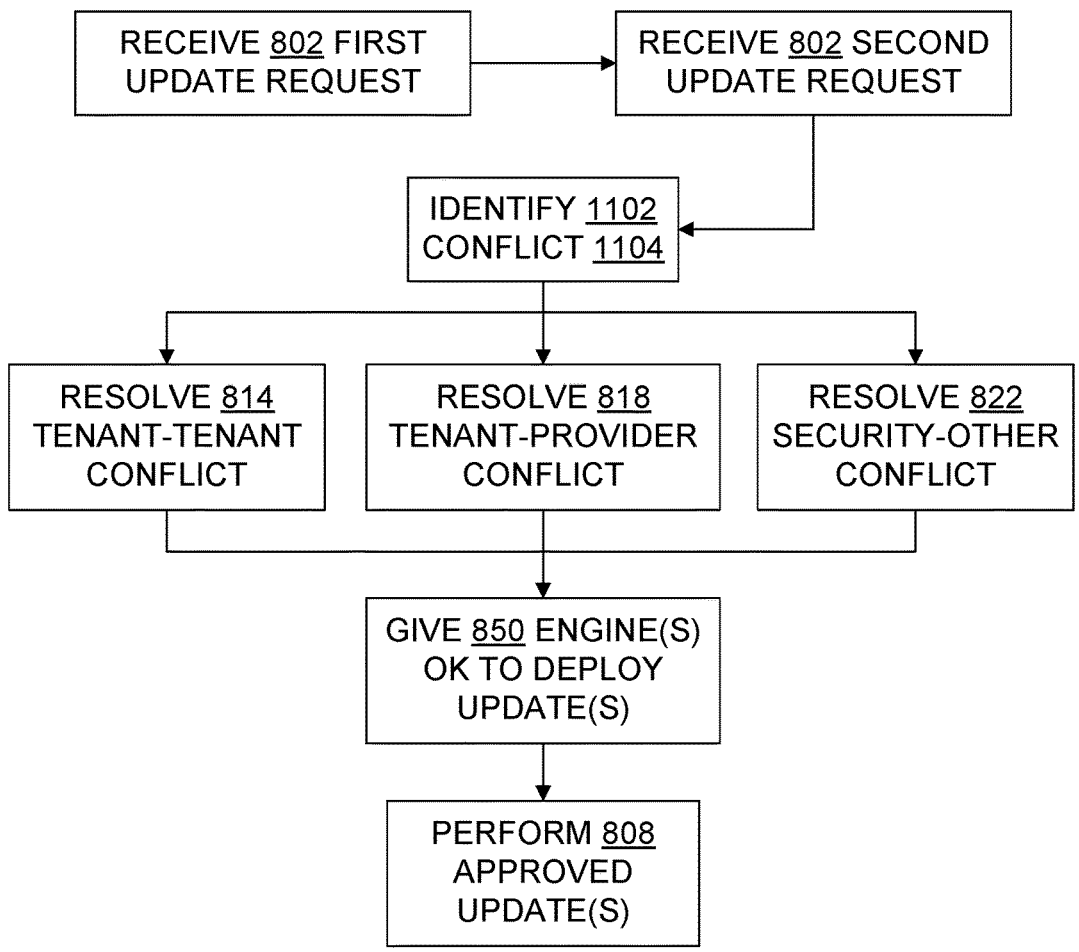
FIG. 11 is another flow chart further illustrating aspects of some process and configured storage medium embodiments.
Figure 12:
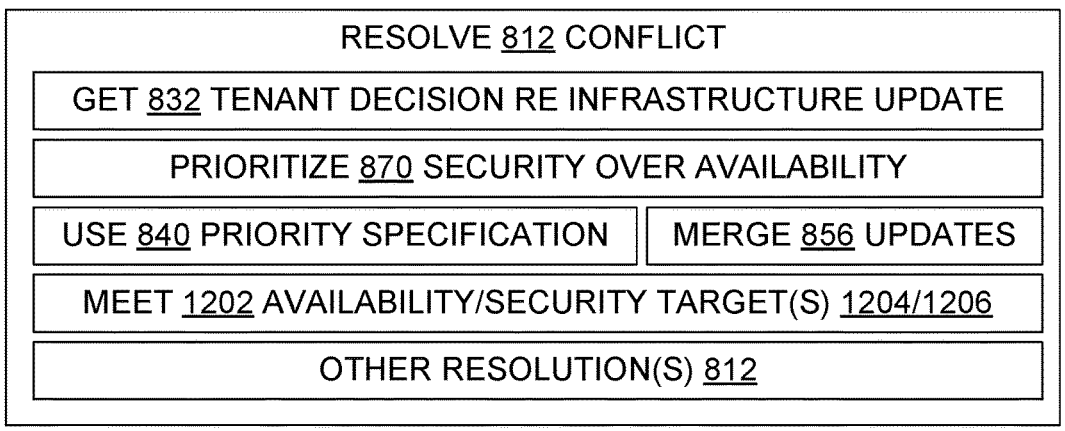
FIG. 12 is a diagram further illustrating aspects of a conflict resolving step in FIG. 11.

FIGS. 11 and 12 also illustrate processes provided or used in some embodiments. As with FIG. 8, one of skill will understand that the flowchart shown can be traversed in various ways during different performances of the illustrated processes. For instance, one process instance may include resolving 814 a tenant-tenant conflict whereas another process instance includes resolving 818 a tenant-provider conflict.

More generally, examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different technical features, mechanisms, and/or data structures, for instance, and may otherwise depart from the examples provided herein.

During a request receiving step 802, an update coordinator system 502 receives a request 512 involving an update. The request content and the communication mechanisms used to transport the request include, for example, those noted in the discussion of other Figures herein.

During an update specifying step 804, a requester specifies details of an update by placing them in a request 512. Suitable details and request formats include, for example, those noted in the discussion of other Figures herein.

During a request coordinating step 806, an update coordinator system 502 coordinates two or more requests 512 involving at least one update. Coordination 806 may include identifying 1102 from one or more of the requests a conflict (actual or potential) involving the update(s), and/or resolving 812 such a conflict, as discussed elsewhere herein, for example.

During an update performing step 808, a cloud 100 performs an update 810 to software which was identified in a request 512. In many implementations, if not all, the update will not be performed by the update coordinator system 502, but will instead by performed by software that is controlled directly by the update requester. That is, the update coordinator system 502 is intended to complement familiar update mechanisms and deployment engines in a gate-keeping role, not to entirely replace them. The time, extent, and other aspects of the performance 808 are at least consistent with, and more often controlled by, the resolution 812 of update conflicts as taught herein.

During a conflict resolving step 812, an update coordinator system 502 resolves a conflict 1104 involving at least one update. Conflicts 1104 occur when mutually exclusive results are requested (implicitly or explicitly). In Example One above, for instance, never bringing the database application down for more than five seconds at a time is mutually exclusive with performing the device driver update that will make the database application unavailable for at least nine seconds. In Example Two above, running the tenant's software continuously on at least twenty virtual machines spread evenly between two availability zones is mutually exclusive with running that same software on less than twenty virtual machines and/or running it within only a single availability zone in order to install the security patch faster. In Example Three above, providing sufficient bandwidth to tenant X during a broadcast is mutually exclusive of providing the desired bandwidth to tenant Y during the same time period as the broadcast. One of skill will recognize other conflicts 1104, both from other examples herein and from experience with cloud 100 operations.

The update coordinator system 502 may characterize conflict resolutions in various ways. One approach classifies resolutions on the basis of the kinds of requester 510 involved.

In some implementations, tenant-tenant conflicts 816 (an example of conflicts 1104 in general) can be resolved 814 using priorities 506 specified in documents which may or may not (depending on the implementation) be accessible to tenants but are accessible to the update coordinator. For example, an operating system security update may have priority over an antivirus program signature database 316 update, which has higher priority in turn than an update to online store analytics software. Communications 512, 514 during the resolution 814 are not necessarily visible to tenant software administrators. The use of such communications may be noted, however, in SLAs between the tenants and the underlying provider 124.

In some implementations, tenant-provider conflicts 820 can also be resolved 818 using priority 506 specifications 504. In addition, proposed infrastructure updates may be presented to the tenant to obtain 832 an approval or disapproval. For instance, an IaaS provider may inform 830 a tenant that virtual machines can be updated to improve their speed by taking advantage of new hardware installed in a datacenter, and inform 830 the tenant that all of the virtual machines running in that datacenter will be upgraded on a rolling basis beginning in twenty-four hours, with a corresponding average downtime of three minutes each, unless the tenant objects within two hours of a specified time. Alternately, instead of giving the tenant authority to approve 836 or disapprove 834 the proposed infrastructure update, a provider may simply notify 838 a tenant that an update will occur. An update notification without approval/disapproval authority is a familiar part of some traditional clouds, but routing the notification content through an update coordinator 508 is believed to be new.

Another approach classifies update conflict resolutions on the basis of the kinds of update 810 involved. For instance, resolving 822 a conflict 824 between a security update and other updates may be a higher priority in some implementations. A "security update" is an update which alters the functionality of software with regard to at least one of the following: encryption, protection of personally identifying information, protection of financial information, authentication requirements and/or mechanisms, authorization requirements and/or mechanisms, military information, medical information, or control over access to trade secrets.

During a priority specification accessing step 826, an update coordinator system 502 accesses (typically by reading) a priority specification 504 which associates a priority 506 with a given kind of update. The priority specification 504 may be implemented as a configuration text file, an XML construct, name-value pairs, or a binary document, for example. As a simple example, a priority specification 504 could include the following information:

| Update | Priority (1 is highest) |
|---|---|
| Zero-day | 1 |
| VM | 2 |
| PaaS-as-tenant | 3 |
| Tenant-OS | 4 |
| Platinum-tenant-app | 5 |
| Antivirus | 6 |
| Gold-tenant-app | 7 |

Conflicts can be resolved 812 by using 840 the priorities specified. According to this particular priority specification, for instance, all updates requested by a PaaS provider (who is a special tenant from the IaaS provider's perspective) will be prioritized 870 over tenant requests to update their operating systems, which take priority 870 in turn over requests from tenants (platinum or gold level) to update their applications. Of course, many other priority specifications can also be used 840 consistent with the teachings herein.

In some implementations, priorities are associated with particular updates, instead of (or in addition to) being associated with respective groups or categories of updates as in the simple priority specification example above. In some of these implementations, priorities are not static. For example, in some implementations, a particular operating system update may receive an increase 842 in priority 506 after that update has been postponed 844 by the update coordinator system 502 a specified number of times and/or for a specified period of time and/or when it has been merged 856 into another update.

With the benefit of the teachings herein, one of skill may recognize that introducing an update coordinator system 502 into a cloud 100 also introduces risks that the update coordinator system 502 may be misused. Misuse of the update coordinator system 502 and/or update requester software 510, or related malicious activity, is denoted generally herein as rogue behavior 848. One example of rogue behavior 848 would be transmission of update requests that should not be approved, and another would be approval of requests 512 that should not be approved, e.g., because they involve falsified identification of the requester 510 or they request updates that are spurious or malicious. Another example of rogue behavior 848 would be disapproval of requests 512 that should have been approved, e.g., tampering to favor one tenant over other tenants in a hidden manner that contradicts the priority specification 504 that is nominally controlling conflict resolution. Rogue behavior may be detected 846 automatically by looking for frequency spikes or other statistically significant departures from past behavior of requesters 510 and/or update coordinators 508, or by assessing the impact of requests (before and/or after approval/disapproval) on cloud security and/or resource availability, for example. Some rogue behavior may also be detected manually by administrators 104 in the course of investigating the cause of an availability failure or a security lapse. Rogue behaviors may be reduced or avoided by authenticating the requester software 510 and the update coordinators 508 to one another, by securely limiting access to the priority specification(s) 504 and availability specifications 828, and by taking the same kind of strong measures to control updates to the update coordinators 508 that are taken traditionally to control updates to the hypervisor and other IaaS infrastructure code.

In FIG. 8, a distinction is made between responding 872 to an update request with an approval 836 or disapproval 834 of the request 512, on the one hand, and giving 850 an approval 854 or disapproval 852 of a subsequent deployment. In many implementations, this distinction between update requests and update deployments will be appropriate because the request approval 836 or disapproval 834 will be given 872 by an update coordinator 508, whereas the deployment approval 854 or disapproval 852 will be given 850 by a requester 510 or other tenant code, at least so far as deployment of a tenant update is concerned. The distinction between a request and a deployment is also appropriate when the request seeks permission for a deployment that will not occur as soon as possible after the request is approved, but will occur instead at some later specified time.

In some implementations, two or more updates 810 can be merged 856 by the update coordinator 508 into a single joint update 858 (which is an example of an update generally and hence also designated at 810). For example, two updates that would each individually have caused downtime can be performed concurrently, so that the downtimes overlap. A tenant may be expected to already perform such optimizations internally with regard to updates that impact only the software of that tenant, but prior to the innovation taught herein, the automatic coordination of an update to tenant software 122 controlled by the tenant 120 with an update to infrastructure software 126 controlled by the infrastructure provider 124 was not known. A virtual machine update and a tenant application update can be concurrently performed 808 as a joint update 858 by the infrastructure provider 124 and the tenant 120, for example, under the guidance of the update coordinator 508.

In some implementations, update requests are not necessarily concerned only with future updates; updates currently underway may also be coordinated. For example, an update coordinator 508 may allow 860 one update to complete even though a higher priority update has been requested, on the basis that the update underway has already been started. On the other hand, the update coordinator 508 may effectively preempt 862 an update that is underway, via instructions to a requester 510 and/or a deployment engine, in order to allow a higher priority update to be performed.

In some implementations, the update coordinator 508 may determine 864 the expected downtime 868 that performing an update will likely incur. This determination 864 may be based on an estimate in the update request and/or on historic metrics maintained by or on behalf of the update coordinator 508. Indeed, the repeated presentation of unrealistic downtime estimates in update requests may be considered a form of rogue behavior, which the update coordinator 508 detects 846 by comparing the estimates with the historic metrics. In the case of joint updates, separate contributions 866 to the downtime from each constituent update may be similarly determined.

Some examples provide or utilize a method in which an update coordinator receives requests and coordinates the updates by resolving conflicts, such as tenant vs. tenant conflicts, tenant vs. infrastructure provider conflicts, or conflicts between security as the highest priority and something else as top priority. One method of coordinating updates in a multi-tenant cloud computing environment 100 includes (a) an update coordinator 508 receiving 802 a first update request 512 from a first update requester 510 specifying 804 a first update 810 to at least part of the cloud computing environment, (b) the update coordinator receiving a second update request from a second update requester specifying a second update to at least part of the cloud computing environment, the update requesters 510 being distinct entities in that they are respectively controlled by parties (tenants 120 and/or providers 124) who are themselves controlled independently of one another, and (c)

coordinating 806 the update requests to control performance 808 of at least one update including at least one of the following acts: (i) resolving 814 a conflict 816 between update requests from independently controlled tenants of the cloud computing environment, (ii) resolving 818 a conflict 820 when one update requester is a tenant of the cloud computing environment and the other update requester is a cloud computing infrastructure service provider that provides infrastructure services to multiple independently controlled tenants, or (iii) resolving 822 a conflict 824 when one update request has security as a highest priority and the other update request does not have security as the highest priority.

Sometimes an update coordinator 508 lets a tenant approve (or not approve) one or more infrastructure updates. In at least one method, one of the update requests 512 includes an infrastructure update request from the infrastructure service provider 124, and resolving the conflict includes presenting 830 the infrastructure update request to the tenant for approval or denial.

Sometimes an update coordinator 508 notifies a tenant in advance of one or more infrastructure updates. At least one method includes notifying 838 the tenant of an upcoming performance of the infrastructure update. Notification 838 may be via email, recorded voice message, text or SMS message, or any other suitable electronic communication mechanism.

In some examples, fixing one or more multi-region infrastructure services can take priority over other updates, as an established practice. In at least one method, in a situation in which the first update request 512 specifies an update to an infrastructure component 126 which spans at least two regions 250 of the cloud computing environment 100 and each region contains at least one datacenter 256, coordinating 806 the update requests includes prioritizing 870 the first update over the second update based on a predetermined priority specification 504. In a given cloud 100, such a region-spanning component may, for example, provide cross-region replication services, time synchronization services, or even the update conflict resolution services.

In some examples, infrastructure updates can become higher priority when they've been postponed. At least one method includes increasing 842 a priority level 506 of the infrastructure update 810 (which may be done in this instance by increasing the priority of the corresponding update request), in response to postponing 844 performance of the infrastructure update beyond a specified threshold. Then coordinating 806 the update requests includes prioritizing 870 the postponed infrastructure update 810 over an update request 512 which previously had a higher priority than the infrastructure update. That is, the increased priority moves the postponed update ahead in line out of order.

In some examples, rogue update coordinators 508 and/or rogue update requesters 510 can be detected by their bad behavior. At least one method includes detecting 846 rogue behavior 848 by detecting 846 at least one of the following: (i) one or more approvals of a flood quantity of update requests 512, the one or more approvals 836 contributing to degradation of a tenant resource such that a measure of the availability of that resource fails to meet 1202 a predetermined availability target 1204, or (ii) one or more disapprovals 834 of update requests 512, the disapprovals contributing to degradation of a cloud infrastructure component 126 such that a measure of security related to that component fails to meet 1202 a predetermined security target 1206. For example, approvals of an unusually high number of update requests may cause updates that degrade or interrupt execution of tenant applications below an availability target 1204 that is specified as a minimum number of concurrently running instances or as a minimum number of transactions per second. Similarly, disapprovals of security updates may lead to violation of a security target 1206 that is specified as a maximum permitted delay between an operating system vendor's publication of a security patch and the installation of the patch in all instances of the operating system running in the cloud.

In some examples, updates can be done by different deployment engines. That is, in some variations of the methods discussed above, coordinating 806 the update requests includes giving a first deployment engine 218 approval to perform the first update 810 and giving a second and different deployment engine 218 approval to perform the second update 810. In particular, an infrastructure provider 124 and a tenant 120 may use different update deployment mechanisms even though both entities coordinate their updates through the same coordinator 508. Similarly, different tenants 120 can use their own respective deployment mechanisms.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to mere propagated signals). The storage medium which is configured may be in particular a removable storage medium 114 such as a CD, DVD, or flash memory. A general-purpose memory, which may be removable or not, and may be volatile or not, can be configured into an embodiment using items such as update requests 512, update responses 514, update priority specifications 504, requester software 510, and update coordinator software 508, in the form of data 118 and instructions 116, read from a removable medium 114 and/or another source such as a network connection, to form a configured medium. The configured medium 112 is capable of causing a computer system to perform technical process steps for identifying 1102 and resolving 812 update conflicts 1104 as disclosed herein. The Figures thus help illustrate configured storage media embodiments and process embodiments, as well as system and process embodiments. In particular, any of the process steps illustrated in FIG. 8, FIG. 11, or otherwise taught herein, may be used to help configure a storage medium to form a configured medium embodiment.

For example, in some methods (whether viewed as methods in their own right or as methods implemented with a computer-readable storage medium), availability can be a higher priority than security. In at least one example, an availability specification 828 specifies a maximum period of time 1306 for which the tenant software 122 can be unavailable (i.e., not running effectively), and coordinating 806 the update requests includes determining 864 that performing 808 the infrastructure update would make the tenant software unavailable for more than the specified maximum period of time. Then the method postpones 844 or disapproves 834 the infrastructure update request, even though doing so contributes 866 to a failure to meet a security target 1206.

In some examples, update policies can specify various availability targets. For instance, coordinating 806 the update requests may include accessing 826 an availability specification 828 which specifies at least one of the following: a time period 1306 in which any updates should be performed, a minimum number 1302 of fault domains to maintain as available during any update, a computing power threshold availability 1304 to maintain during any update.

In some examples, fixing zero-day vulnerabilities takes priority over availability. For instance, when an infrastructure update request 512 specifies a security update 810 to correct an identified zero-day vulnerability, coordinating 806 the update requests may include prioritizing 870 the infrastructure update request over a tenant update request. This may be done even though it reduces availability below a target level. That is, in some cases prioritizing 870 the infrastructure update over the tenant update request contributes 866 to a failure to satisfy an availability target 1204 of the tenant software.

Regional Update Manager

Figure 9:
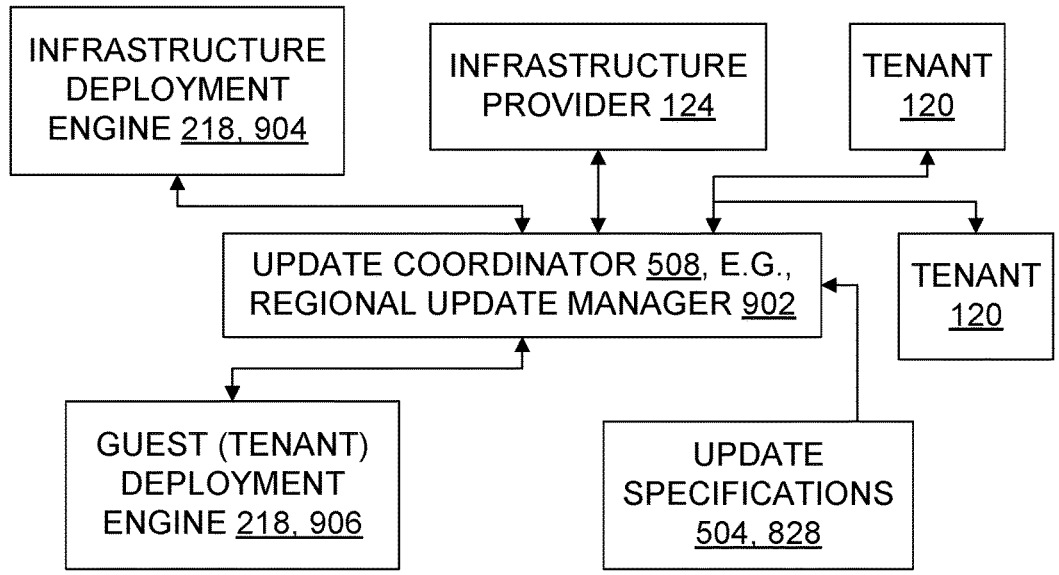
FIG. 9 is a data flow diagram illustrating aspects of an architecture which includes a regional update manager that coordinates update requests in a region of a multi-tenant cloud.

FIG. 9 illustrates a cloud environment 100 which includes an update coordinator 508 in the form of a regional update manager 902. The regional update manager 902 may operate in the manner of an update coordinator 508 as discussed herein, but is localized to focus on one region 250 of the cloud environment 100; update requests in other regions are directed to other regional update manager instances located in those other regions. Some of the other regions may also lack any regional update manager, so the updates in those regions are handled in a traditional manner without the benefit of update conflict identification and resolution as taught herein.

In the illustrated cloud environment 100 of FIG. 9, one deployment engine 218 is controlled and used by an infrastructure provider and hence designated at 904 as an infrastructure deployment engine, and another deployment engine 218 is controlled and used by a tenant (a.k.a. guest) and hence designated at 906 as a guest deployment engine. As noted elsewhere herein, a distinction is made between approval of an update and deployment of the update. In particular, although the regional update manager 902 is responsible for approving both infrastructure updates and tenant updates, those updates once approved may be deployed by different engines 218.

In some examples, the regional update manager 902 coordinates infrastructure updates governed by a public cloud and application updates governed by a tenant. These two types of updates could be driven by different deployment engines. The tenants may specify the availability requirements of their applications (e.g., spread twenty virtual machines across two regions and never have less than nine virtual machines running at any point—which means that one region may fail and operations can update one virtual machine in the region that is up).

In some examples, the regional update manager 902 has policies 504 that define how conflicting update requests are to be performed. For instance, in the presence of zero-day attacks the regional update manager prioritizes 870 infrastructure updates for security patches. The regional update manager may present an API that allows clients to request updates, which are approved or not according to the specified policies and in keeping with the tenant's availability specification.

As another example, assume that a public cloud 100 is divided into regions 250, which represent different geographic locations such as North Europe and West Europe, or Japan East and Japan West. Each region may have one or more availability zones (AZs), and each availability zone 252 will have one or more datacenters (DCs), consistent with FIG. 10. Each DC 256 will have servers 1002 deployed into racks 1004. The likelihood of failures decreases as one goes from server to rack, from rack to DC, from DC to AZ, and from AZ to region. Tenants 120 running on the public cloud may specify their availability requirements using these constructs, for instance, by requiring that the hundred virtual machines 306 used for a given service be spread equally across regions and, for each region, equally across AZs.

In such a configuration, some methods include the regional update manager 902 receiving 802 and responding 872 to requests for infrastructure updates and application updates. Some include the regional update manager presenting 830 update requests to tenants for approval according to their policies in order to preserve the availability of tenant services. Some include the regional update manager approving 836 security infrastructure update requests without notifying the tenants.

In some clouds 100, there are two types of updates 810 that impact the availability of virtual machines. One type is infrastructure updates, such as new versions of the host hypervisor (sometimes called the "host operating system") or other cloud infrastructure software 126 to be deployed. Examples of this may include fixes to a networking stack in the presence of potential security threats. These updates are traditionally controlled by the public cloud provider 124. A second type is guest updates, such as updates to the guest operating system 302 of the virtual machine or updates to the tenant's application code 122 running inside the virtual machines. These updates are traditionally controlled by the tenants.

These two types of updates may be conflicting, and their combination may cause the availability requirements 1204 of a given service to be violated. For instance, if service A requires 90% of its virtual machines to be always up, one cannot have concurrent infrastructure and guest updates which each impact a different 6% of service A's virtual machines and still meet the 90% requirement; at most 88% of the virtual machines will be up.

Some examples use or include a regional update manager 902 as a regional update coordination service, such that all the servers in a given region (in all DCs and AZs in that region) may communicate with the same instance of regional update manager 902. There may be a different instance of a regional update manager 902 running in each different region 250.

FIGS. 5 and 9 illustrate one architecture of a regional update manager. In some examples, the regional update manager 902 has a relatively simple interface: it receives update requests 512 which are submitted by the infrastructure deployment system and guest deployment system. That is, the requester 510 may be implemented as an innovative addition to, and hence part of, a deployment engine 218. The provider and the guest(s) can use the same or different deployment systems as one another. In particular, the tenant may choose its own deployment system for managing guest updates. In some cases, the regional update manager presents these update requests to the tenants, which approve them according to their policies in order to preserve the availability requirements of their own services. In some cases, the regional update manager also has or uses policies that may approve infrastructure update requests without notifying the tenants, for instance, in the presence of a zero-day vulnerability.

The following are among the many suitable examples of relative priorities 506 that may be used 840 by a regional update manager 902 or other update coordinator system 502 where 1 represents the highest priority:

(a) Customer interactive actions such as updating an application: 3

(b) Customer policy actions triggered by the system 502, such as automatic OS upgrades of the customer 120 virtual machine: 5

(c) Infrastructure actions triggered by the system 502, such as hypervisor/host OS patching of a host node for a critical security flaw: 2

(d) SLA enforcement such as preempting a lower priority SLA customer's application because a higher SLA workload gets activated: 2

(e) Compliance tracking such as routine scanning of the virtual machine as part of an anti-virus update: 8

In some examples, if there are no update actions 810 underway and no unanswered requests, then the update coordinator 508 has nothing to do. If there is an update action underway and a request 512 for a second update action arrives, the coordinator 508 could perform one or more of these acts:

(a) Merge 856 the two actions 810 where possible. For example, merge a host patch and an OS upgrade into one action.

(b) Allow 860 a higher priority action to complete before letting in a lower priority one. For example, if a customer application 202 upgrade is underway then wait for it to complete before initiating a compliance scan.

(c) Preempt 862 a lower priority action to allow a higher priority one. This may be avoided when actions could be merged. However in some cases preemption may be performed. For example, if a customer-initiated update is underway and a higher SLA customer needs capacity, then the operation on the action on the lower SLA tenant could be cancelled and the customer could be notified.

In some cases, an update coordinator 508 may be implemented in a fabric 312, e.g., as part of a fabric controller. Nodes leased from the fabric 312 may implement allocation, goal state driving, multi-tenancy, health monitoring, repairs and deployment at the data level within the leased nodes. The tenant nodes may have their own controller inside them that has its own view of node health and its own repair state machine, for example. Thus, the fabric controller and the tenant node's own controller may compete to manage the same set of nodes. In such cases, the update coordinator may include a management role (MR) which operates as taught herein. In particular, the update coordinator MR may give the tenant's own controller facts that the fabric controller has regarding the tenant's performance. Depending on a privilege level of the tenant, the MR may let the tenant decide what to do in response to an alert, or may at least give the tenant performance information to help the tenant orchestrate actions within the tenant node.

Clouds, Regions, Datacenters in a Hierarchy

Figure 10:
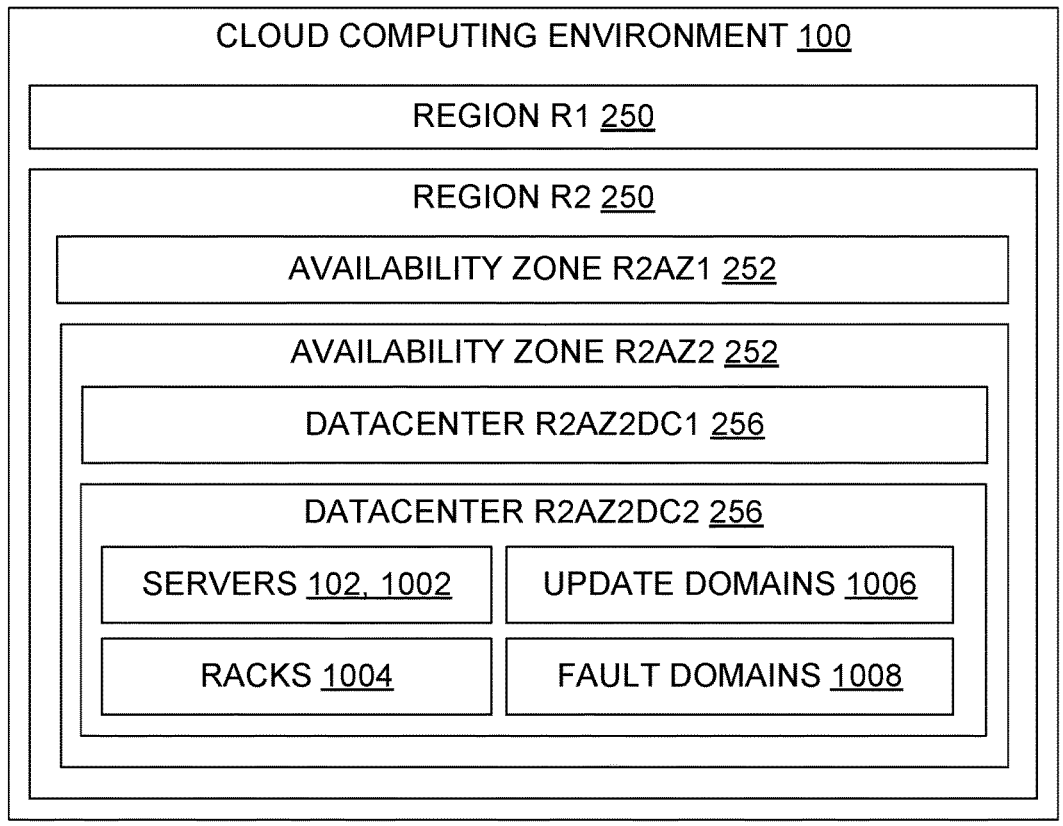
FIG. 10 is a block diagram illustrating a hierarchy of regions, availability zones, datacenters, and other items in a cloud computing environment.

FIG. 10 further illustrates a relationship between regions and clouds in some implementations. The illustrated cloud 100 includes two regions 250, which are defined by the cloud IaaS provider. A region 250 typically covers a relatively large geographic area, such that a tornado, hurricane, earthquake, flood, wildfire, or similar natural disaster does not span the entire region. A geography (not shown) such as a country or union of countries often contains one or two regions, but that depends on the capabilities of the IaaS provider. At the time of writing, for instance, Microsoft Azure® IaaS services recognized eight regions in the United States (Central US, East US, East US 2, US Gov Iowa, US Gov Virginia, North Central US, South Central US, West US) (mark of Microsoft Corporation), and Amazon AWS® IaaS services recognized four regions in the United States (us-east-1, us-west-1, us-west-2, GovCloud) (mark of Amazon Technologies, Inc.).

As illustrated, a region may include one or more availability zones 252. Different IaaS providers may define availability zones differently, but in general availability zones are smaller than regions, are larger than an individual datacenter 256, and are physically isolated from one another by at least ten kilometers. Availability zones may be connected in some cases by a network which has low-enough latency to support synchronous replication for all tenant workloads. Availability zones contain one or more datacenters 256; a datacenter may also reside directly within a region with no intervening availability zone, in some configurations.

A datacenter 256 (a.k.a. "data center" with a blank space) is a facility which houses physical computers, e.g., servers 1002, and supporting hardware, e.g., racks 1004, power transmission lines, network transmission lines, etc. The computers in a given datacenter typically share some facility-level infrastructure, such as cooling equipment, a connection to an electric power grid, a backup source of electric power, and/or a surrounding fence and other physical security measures. Typically, all of the computers 102 in a datacenter are owned by the same IaaS provider.

Update domains 1006 are logical units of software deployment. For example, an IaaS provider may group virtual machines into update domains, and deploy updates one such domain at a time. Deployment stops the software instances that are running within a targeted upgrade domain, upgrades them, brings them back online, and moves on to the next upgrade domain.

Fault domains 1008 are logical units of hardware failure, typically based on single points of failure. For example, when a failure of a power supply for a rack will bring down every server in the rack, an IaaS provider may group each rack of servers into its own fault domain.

Additional System Examples

Additional details and design considerations are provided below. As with the other examples herein, the features described may be used individually and/or in combination, or not at all, in a given embodiment.

Some examples use or provide a system 502 which coordinates competing updates in a cloud computing environment 100. The system includes at least one processor 110, at least one memory 112 (volatile and/or non-volatile) in operable communication with the processor, and one or more priority specifications 504 residing in the memory. An update coordinator 508 including instructions 116 also resides in the memory. The update coordinator instructions are executable by the processor to perform a method which includes (a) the update coordinator receiving a first update request from a first update requester specifying a first update to at least part of the cloud computing environment, (b) the update coordinator receiving a second update request from a second update requester specifying a second update to at least part of the cloud computing environment, the update requesters being distinct entities, and (c) coordinating the update requests to control performance of at least one update. In this example, the coordination 806 includes at least one of the following acts: (i) resolving 812 a conflict between update requests from independently controlled tenants of the cloud computing environment, (ii) resolving 812 a conflict when one update requester is a tenant of the cloud computing environment and the other update requester is a cloud computing infrastructure service provider that provides infrastructure services to multiple independently controlled tenants, (iii) resolving 812 a conflict when one update request has security as a highest priority and the other update request does not have security as the highest priority, or (iv)

resolving 812 a conflict when one update request has security of multiple tenants as a highest priority and the other update request has resource availability to a particular tenant as the highest priority.

In some configurations, the update coordinator is local to a datacenter. In one example, the cloud computing environment 100 includes at least one datacenter 256 containing at least three fault domains 1008, and the update coordinator 508 of the system receives requests which collectively span at least two of the fault domains. One of skill will recognize that datacenters, fault domains, and update requests, like many other items discussed herein, are aspects of computing technology not amenable to management through mental steps alone.

In some configurations, the update coordinator is local to a region. In one example, the cloud computing environment 100 includes at least one region 250 containing at least two datacenters 256, each datacenter includes at least a thousand servers 1002, and the update coordinator of the system receives requests which collectively span at least two of the datacenters. One of skill will recognize that effectively managing a thousand or more servers cannot be done without automation; manual human actions alone will not suffice.

In some examples, the specification 504 includes priorities 506 which meet at least one of the following conditions: (a) updating tenant application software is a higher priority than updating a tenant-controlled virtual machine operating system; (b) updating a tenant-controlled virtual machine operating system to correct an identified security vulnerability is a higher priority than updating tenant application software; (c) updating tenant application software is a higher priority than updating anti-virus software 316 in a tenant-controlled virtual machine; (d) updating a tenant-controlled virtual machine operating system to correct an identified security vulnerability is a higher priority than otherwise updating a tenant-controlled virtual machine operating system; (e) updating a tenant-controlled virtual machine operating system to correct an identified security vulnerability is a higher priority than updating anti-virus 316 software in a tenant-controlled virtual machine.

In some examples, updates involving familiar pieces of cloud architectures are coordinated. For instance, in some cases at least one update request specifies an update to at least one of the following components of the cloud computing environment: a software framework 410, a storage blob 304, a service fabric 312, a map-reduce block 226, a payments block 228, a content delivery block 230 for delivering multimedia content, a workforce block 232, a messaging block 236, an email block 234, a compute infrastructure block 240, a storage infrastructure block 242, a network infrastructure block 244, a database infrastructure block 246.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 8, 11, and 12 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A method of coordinating updates in a multi-tenant cloud computing environment, the method comprising:
   an update coordinator receiving a first update request from a first update requester specifying a first update to at least part of the cloud computing environment;
   the update coordinator receiving a second update request from a second update requester specifying a second update to at least part of the cloud computing environment, the update requesters being distinct entities;
   coordinating the update requests to control performance of at least one update including at least one of the following acts: (i) resolving a conflict between update requests from independently controlled tenants of the cloud computing environment, (ii) resolving a conflict when one update requester is a tenant of the cloud computing environment and the other update requester is a cloud computing infrastructure service provider that provides infrastructure services to multiple independently controlled tenants, (iii) resolving a conflict when one update request has security as a highest priority and the other update request does not have security as the highest priority, or (iv) resolving a conflict when one update request has security of multiple tenants as a highest priority and the other update request has resource availability to a particular tenant as the highest priority, and wherein coordinating the update requests includes giving a first deployment engine approval to perform the first update and giving a second and different deployment engine approval to perform the second update; and
   detecting rogue behavior based at least in part on at least one of the following: (i) one or more update request approvals, or (ii) one or more disapprovals of update requests.

2. The method of claim 1, in which one of the update requests includes an infrastructure update request from the cloud computing infrastructure service provider that provides infrastructure services to multiple independently controlled tenants, and resolving the conflict comprises presenting the infrastructure update request to at least one tenant for approval or denial.

3. The method of claim 1, in which coordinating the update requests includes notifying at least one tenant of an upcoming performance of the infrastructure update.

4. The method of claim 1, in which the first update request specifies an update to an infrastructure component which spans at least two regions of the cloud computing environment, each region containing at least one datacenter, and wherein coordinating the update requests includes prioritizing the first update over the second update based on a predetermined priority specification.

5. The method of claim 1, in which one of the update requests includes an infrastructure update request from the cloud computing infrastructure service provider that provides infrastructure services to multiple independently controlled tenants, and further comprising increasing a priority level of the infrastructure update in response to postponing performance of the infrastructure update beyond a specified threshold, and wherein coordinating the update requests includes prioritizing the postponed infrastructure update over an update request which previously had higher priority than the infrastructure update.

6. The method of claim 1, wherein detecting rogue behavior comprises detecting one or more approvals of a flood quantity of update requests, the one or more approvals contributing to degradation of a tenant resource below a predetermined availability target.

7. The method of claim 1, wherein resolving the conflict comprises merging the first update and the second update into a joint update.

8. The method of claim 1, wherein the first update has a higher priority than the second update, and resolving the conflict comprises at least one of the following: allowing the first update to complete before beginning the second update, or preempting performance of the second update in favor of performance of the first update.

9. A computer-readable storage medium configured with software which upon execution performs a method of coordinating updates in a multi-tenant cloud computing environment, the method comprising:
   an update coordinator receiving an infrastructure update request from a cloud computing infrastructure service provider, the infrastructure update request specifying an infrastructure update to at least one infrastructure component of the cloud computing environment;
   the update coordinator receiving a tenant update request from a tenant of the cloud computing environment, the tenant update request specifying a tenant update which is limited to tenant software that is specific to that tenant;
   proactively coordinating the update requests to reduce tenant downtime; and
   performing at least one of the updates in a manner consistent with a result of the coordinating step;
   wherein an availability specification specifies a maximum period of time for which the tenant software can be unavailable, and proactively coordinating the update requests includes determining that performing the infrastructure update would make the tenant software unavailable for more than the specified maximum period of time and then postponing or disapproving the infrastructure update request even though doing so contributes to a failure to meet a security target.

10. The computer-readable storage medium of claim 9, in which proactively coordinating the update requests comprises accessing an availability specification which specifies at least one of the following: a time period in which any updates should be performed, a minimum number of fault domains to maintain as available during any update, a computing power threshold availability to maintain during any update.

11. The computer-readable storage medium of claim 9, in which the infrastructure update request specifies a security update to correct an identified zero-day vulnerability, and proactively coordinating the update requests includes prioritizing the infrastructure update request over the tenant update request.

12. The computer-readable storage medium of claim 11, in which prioritizing the infrastructure update over the tenant update request contributes to a failure to satisfy an availability target of the tenant software.

13. The computer-readable storage medium of claim 9, further characterized in at least two of the following ways:
(a) proactively coordinating the update requests includes presenting the infrastructure update request to the tenant for approval;
(b) proactively coordinating the update requests includes notifying the tenant of an upcoming performance of the infrastructure update;
(c) the infrastructure component spans at least two regions of the cloud computing environment, each region containing at least one datacenter, and proactively coordinating the update requests includes prioritizing the infrastructure update request over the tenant update request;
(d) the infrastructure update request identifies an infrastructure update which increased in priority in response to postponing performance of the infrastructure update for a specified period of time and/or postponing performance of the infrastructure update a specified number of times, and proactively coordinating the update requests includes prioritizing the postponed infrastructure update request over the tenant update request;
(e) proactively coordinating the update requests includes merging the infrastructure update and the tenant update into a joint update; or
(f) proactively coordinating the update requests includes giving a first deployment engine approval to perform the infrastructure update and giving a second and different deployment engine approval to perform the tenant update.

14. A system which coordinates competing updates in a cloud computing environment, the system comprising:
a processor;
a memory in operable communication with the processor;
one or more priority specifications residing in the memory; and
an update coordinator including instructions residing in the memory which are executable by the processor to perform a method which includes (a) the update coordinator receiving a first update request from a first update requester specifying a first update to at least part of the cloud computing environment, (b) the update coordinator receiving a second update request from a second update requester specifying a second update to at least part of the cloud computing environment, the update requesters being distinct entities, and (c) coordinating the update requests to control performance of at least one update including at least one of the following acts based on priorities in the one or more priority specifications: (i) resolving a tenant-tenant conflict between update requests from independently controlled tenants of the cloud computing environment, (ii) resolving a conflict when one update requester is a tenant of the cloud computing environment and the other update requester is a cloud computing infrastructure service provider that provides infrastructure services to multiple independently controlled tenants, or (iii) resolving a security-based conflict, namely, a conflict when one update request has security as a highest priority and the other update request does not have security as the highest priority;
giving a first deployment engine approval to perform the first update and giving a second and different deployment engine approval to perform the second update; and
detecting rogue behavior based at least in part on at least one of the following: (i) one or more update request approvals, or (ii) one or more disapprovals of update requests.

15. The system of claim 14, wherein at least one of the following conditions holds: (i) the cloud computing environment includes at least one datacenter containing at least three fault domains, and the update coordinator of the system receives requests which collectively span at least two of the fault domains, or (ii) the cloud computing environment includes at least one region containing at least two datacenters, each datacenter includes at least a thousand servers, and the update coordinator of the system receives requests which collectively span at least two of the datacenters.

16. The system of claim 14, wherein the update coordinator includes instructions residing in the memory which are executable by the processor to coordinate the update requests to control performance of at least one update at least in part by resolving the tenant-tenant conflict between update requests from independently controlled tenants of the cloud computing environment.

17. The system of claim 14, wherein the specification includes priorities which meet at least one of the following conditions:
(a) updating tenant application software is a higher priority than updating a tenant-controlled virtual machine operating system;
(b) updating a tenant-controlled virtual machine operating system to correct an identified security vulnerability is a higher priority than updating tenant application software;
(c) updating tenant application software is a higher priority than updating anti-virus software in a tenant-controlled virtual machine;
(d) updating a tenant-controlled virtual machine operating system to correct an identified security vulnerability is a higher priority than otherwise updating a tenant-controlled virtual machine operating system;
(e) updating a tenant-controlled virtual machine operating system to correct an identified security vulnerability is a higher priority than updating anti-virus software in a tenant-controlled virtual machine.

18. The system of claim 14, in which the update coordinator includes instructions residing in the memory which are executable by the processor to coordinate the update requests to control performance of at least one update at least in part by resolving the security-based conflict when priorities in the one or more priority specifications specify that one update request has security as the highest priority and the other update request does not have security as the highest priority.

19. The system of claim 14, wherein at least one update request specifies an update to at least one of the following components of the cloud computing environment: a software framework, a storage blob, a service fabric, a map-reduce block, a payments block, a content delivery block, a workforce block, a messaging block, an email block, a compute infrastructure block, a storage infrastructure block, a network infrastructure block, a database infrastructure block.

20. The system of claim 14, in which the method further comprises presenting at least one update request to at least one tenant for approval or denial.

* * * * *